(12) United States Patent
Tanaka et al.

(10) Patent No.: US 7,362,957 B2
(45) Date of Patent: Apr. 22, 2008

(54) REPRODUCING APPARATUS

(75) Inventors: Yasuyuki Tanaka, Tokyo (JP); Tatsuya Naito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1596 days.

(21) Appl. No.: 09/760,154

(22) Filed: Jan. 12, 2001

(65) Prior Publication Data

US 2001/0009608 A1 Jul. 26, 2001

(30) Foreign Application Priority Data

Jan. 25, 2000 (JP) ............................. 2000-015713
Feb. 28, 2000 (JP) ............................. 2000-051097

(51) Int. Cl.
*H04N 7/26* (2006.01)

(52) U.S. Cl. ..................... 386/109; 386/113; 386/125; 386/126; 386/116; 360/46; 360/51; 348/470; 348/725

(58) Field of Classification Search ................ 386/113, 386/83, 95, 96, 46, 125, 109, 110, 112; 360/51
See application file for complete search history.

(56) References Cited

U.S. PATENT DOCUMENTS

| 5,774,290 | A | * | 6/1998 | Sasaki et al. | .................. 360/51 |
| 6,160,673 | A | * | 12/2000 | Izumi et al. | .................. 360/46 |
| 6,281,936 | B1 | * | 8/2001 | Twitchell et al. | ........... 348/470 |
| 6,344,749 | B1 | * | 2/2002 | Williams | .................... 324/620 |
| 6,426,780 | B1 | * | 7/2002 | Limberg et al. | ............ 348/725 |

* cited by examiner

*Primary Examiner*—John Miller
*Assistant Examiner*—Jamie J Vent
(74) *Attorney, Agent, or Firm*—Cowan, Liebowitz & Latman, P.C.

(57) ABSTRACT

A reproducing apparatus, in which a reproduced information signal is equalized by an equalizer, includes a detecting circuit for detecting a digital signal from the reproduced information signal, and a controller for controlling an equalizing characteristic of the equalizer according to the reproduced information signal to be inputted to the detecting circuit and a detection result of the detecting circuit.

19 Claims, 20 Drawing Sheets

DATA DETECTING POINT

DATA DETECTING POINT

REPRODUCING APPARATUS

BACKGROUND OF THE INVENTION

1. Field of the Invention

The present invention relates to a reproducing apparatus, and more particularly to an equalizing process for a reproduced information signal.

2. Description of Related Art

Heretofore, there have been known digital VTRs (video tape recorders) arranged to convert a video signal or an audio signal into a digital signal, to record the digital signal on a magnetic tape and to reproduce the digital signal from the magnetic tape. In the digital VTRs, a reproduced signal is subjected to an equalizing process by an equalizer so as to compensate for the deterioration of a signal occurring in a recording and reproducing system, the unevenness of characteristics due to the variety of kinds of tapes, etc. By this process, it is possible to obtain a reproduced signal having few errors.

In addition, there has been known a technical art of controlling the equalizing characteristic of an equalizer on the basis of an error rate in a reproduced signal.

The above-mentioned method of controlling the equalizing characteristic on the basis of an error rate is effective. However, in such a state that there are very few errors with an error rate lowered, the influence of a dropout due to the defect of a tape would become more dominant in the proportion of errors than the influence of the equalizing characteristic of an equalizer.

Therefore, in a case where the equalizing characteristic has been controlled merely on the basis of an error rate obtained for a given period of time, the equalizing characteristic would be changed on the basis of an error due to the dropout, so that there is a possibility that the equalizing characteristic is deteriorated instead of being improved.

In order to avoid such an inconvenience, it is necessary to obtain an error rate by counting up errors for a long period of time up to such a degree that a local increase of the number of errors due to the dropout becomes negligible. Accordingly, it would take a long period of time to obtain an optimum equalizing characteristic.

On the other hand, in the so-called wobbling method in which an optimum equalizing characteristic is sought by varying the equalizing characteristic, although such a direction as to make errors fewer as compared with the present status can be found, a direction in which an optimum point for the equalizing characteristic is located cannot be found. Therefore, according to the wobbling method, there is a possibility that the equalizing characteristic is controlled to a value which does not correspond to the optimum point, although it corresponds to a minimum point for errors.

BRIEF SUMMARY OF THE INVENTION

It is an object of the invention to solve the above-mentioned problems.

It is another object of the invention to perform an excellent control operation for the equalizing characteristic.

It is a further object of the invention to realize an optimum equalizing characteristic quickly and stably.

It is a still further object of the invention to make it possible to control the equalizing characteristic in an optimum manner irrespective of a change of errors due to the influence of other than the equalizing characteristic, such as the influence of a dropout.

To attain the above objects, in accordance with an aspect of the invention, there is provided a reproducing apparatus, which comprises reproducing means for reproducing an information signal, equalizing means for controlling a group delay of the information signal reproduced by the reproducing means, detecting means for detecting a digital signal from the information signal reproduced by the reproducing means, and control means for controlling a group delay characteristic of the equalizing means by using the reproduced information signal to be inputted to the detecting means and a detection result of the detecting means.

These and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings. In the embodiments to be described in the following, the invention is applied to a digital VTR (video tape recorder).

Figure 1:
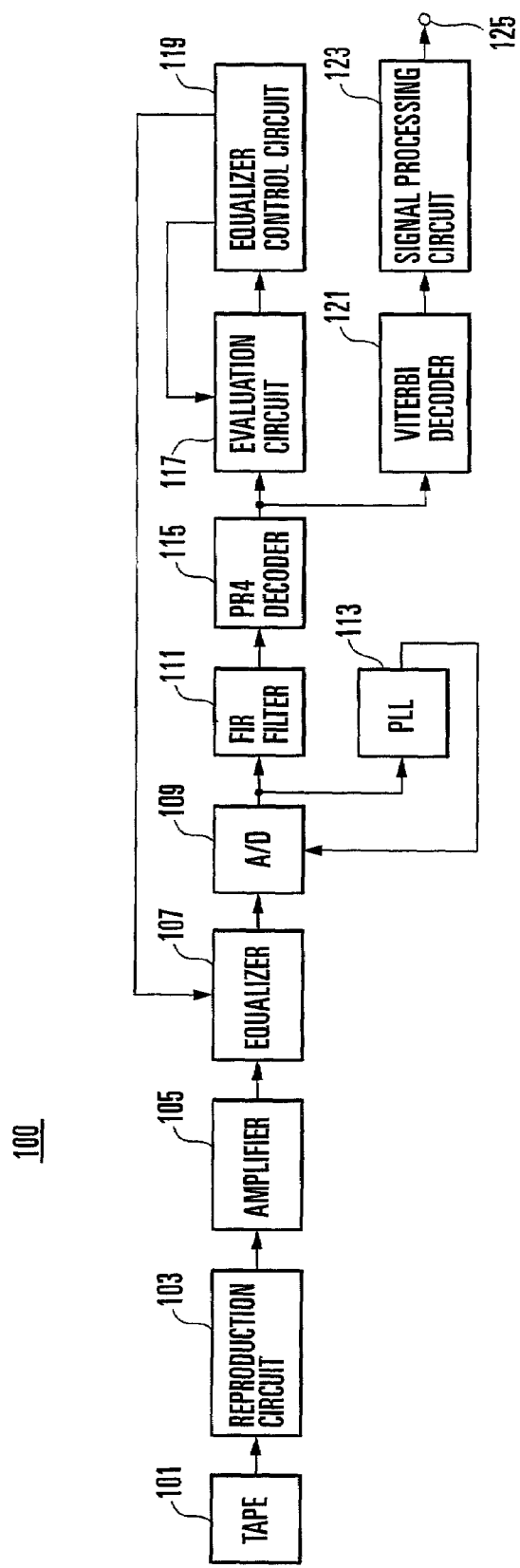
FIG. 1 is a block diagram showing the arrangement of a video tape recorder (VTR) according to a first embodiment of the invention.

FIG. 1 is a block diagram showing the arrangement of a reproducing system of a video tape recorder (VTR) 100 according to a first embodiment of the invention.

Referring to FIG. 1, a reproduction circuit 103 reproduces, by means of a rotary head, an information signal, such as a video signal, an audio signal, a sub-code signal, etc., from a number of helical tracks formed on a tape 101, and outputs the reproduced information signal to an amplifier 105. The amplifier 105 amplifies the reproduced signal received from the reproduction circuit 103, and outputs the amplified signal to an equalizer 107.

The equalizer 107 equalizes the reproduced signal received from the amplifier 105, and outputs the equalized signal to an A/D converter 109.

Figure 2:
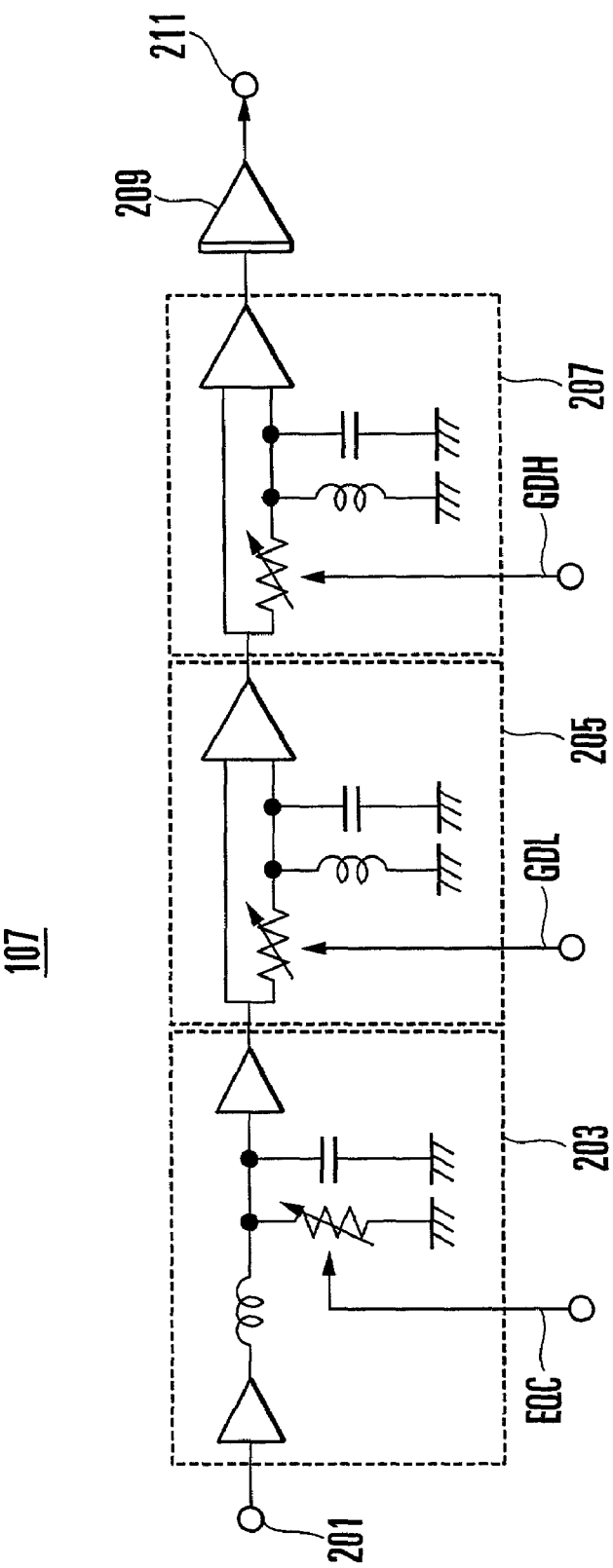
FIG. 2 is a circuit diagram showing the arrangement of an equalizer included in the VTR shown in FIG. 1.

FIG. 2 is a circuit diagram showing the arrangement of the equalizer 107.

The equalizer 107 in the first embodiment includes, as shown in FIG. 2, a filter 203 for emphasizing a high-frequency band (a high-frequency emphasizing circuit), an all-pass filter 205 for controlling the group delay of a low-frequency band, and an all-pass filter 207 for controlling the group delay of a high-frequency band.

Figure 3:
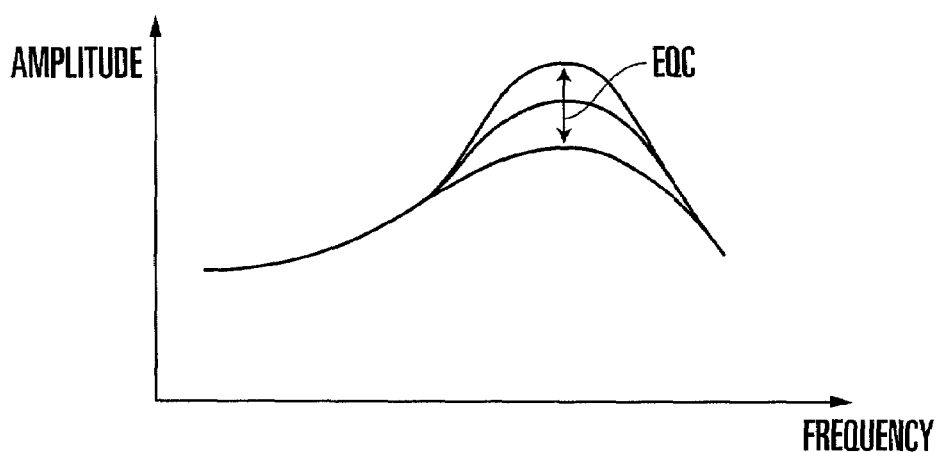
FIG. 3 is a graph showing the frequency characteristic of the equalizer shown in FIG. 2.

The reproduced signal from the amplifier 105 is supplied to the high-frequency emphasizing circuit 203 through an input terminal 201. At the high-frequency emphasizing circuit 203, the reproduced signal is compensated for the deterioration of a high-frequency component caused by a magnetic recording and reproducing system, and is then outputted to the all-pass filter 205. The frequency characteristic of the high-frequency emphasizing circuit 203 is shown in FIG. 3. The high-frequency emphasizing circuit 203 in the first embodiment is able to control the amount of emphasis of a high-frequency component according to a control signal EQC supplied from an equalizer control circuit 119, as shown in FIG. 3.

Figure 4:
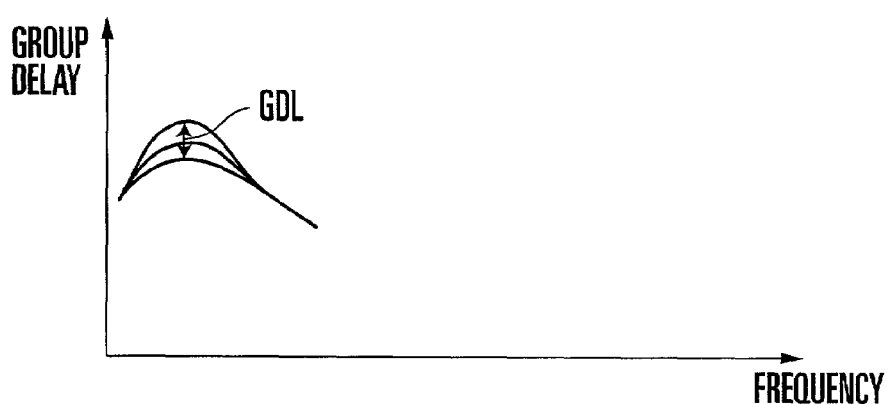
FIG. 4 is a graph showing the group delay characteristic of the equalizer shown in FIG. 2.

The all-pass filter 205, which serves as a group delay circuit, adjusts the group delay of a low-frequency component of the reproduced signal received from the high-frequency emphasizing circuit 203 mainly so as to compensate for the dipulse characteristic of a magnetic tape, and then outputs the adjusted signal to the all-pass filter 207. The group delay characteristic of the all-pass filter 205 is shown in FIG. 4. The group delay characteristic of the all-pass filter 205 is adjustable according to a control signal GDL supplied from the equalizer control circuit 119, as shown in FIG. 4.

Figure 5:
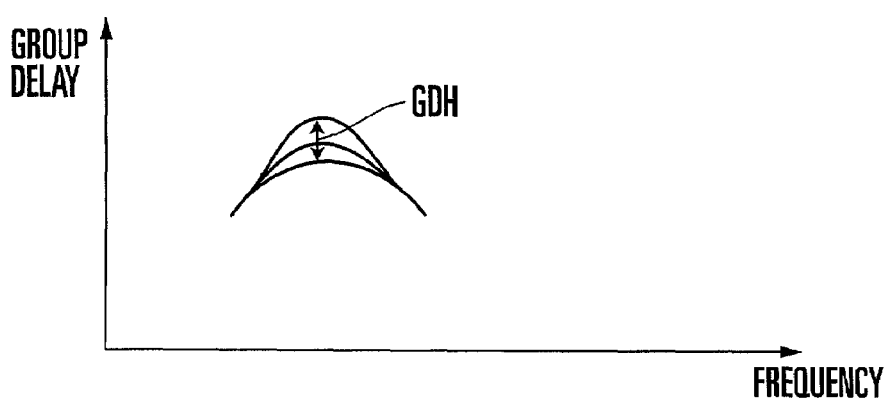
FIG. 5 is a graph showing the group delay characteristic of the equalizer shown in FIG. 2.

The all-pass filter 207, which serves as a group delay circuit, adjusts the group delay of a high-frequency component of the reproduced signal received from the all-pass filter 205 mainly so as to compensate for the delay by the high-frequency emphasizing circuit 203, and then outputs the adjusted signal to an integrator 209. The group delay characteristic of the all-pass filter 207 is shown in FIG. 5. The group delay characteristic of the all-pass filter 207 is adjustable according to a control signal GDH supplied from the equalizer control circuit 119, as shown in FIG. 5.

The reproduced signal outputted from the all-pass filter 207 is subjected to an integrating process by the integrator 209, and is then outputted from an output terminal 211 to the A/D converter 109. At the integrator 209, the deterioration of a direct-current component of the reproduced signal is compensated for.

Figure 6:
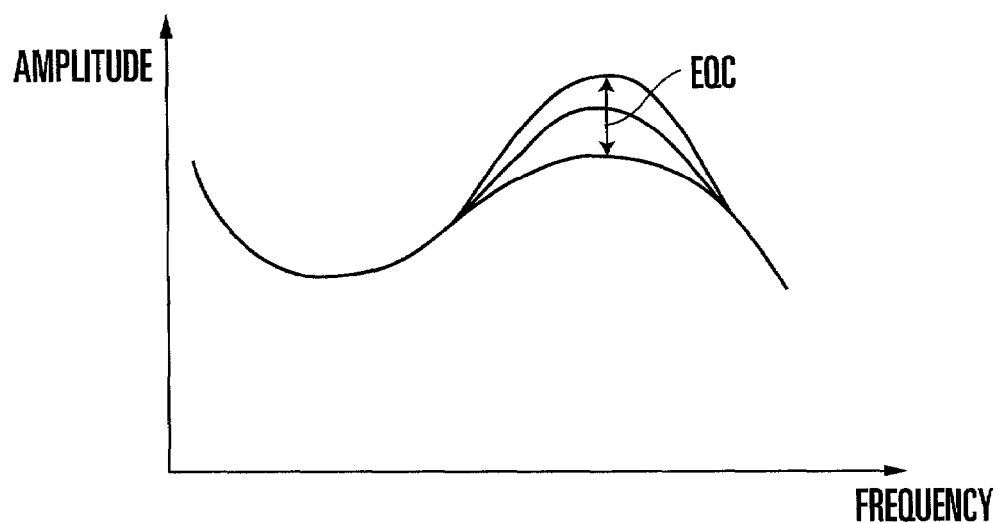
FIG. 6 is a graph showing the frequency characteristic of the entirety of the equalizer shown in FIG. 2.

FIG. 6 is a graph showing the frequency characteristic of the entirety of the equalizer 107. As shown in FIG. 6, the deterioration of a low-frequency component of the reproduced signal is compensated for by the integrator 209, and the deterioration of a high-frequency component of the reproduced signal is compensated for by the high-frequency emphasizing circuit 203. Since a signal reproduced through a magnetic recording and reproducing system has a differentiating characteristic, the reproduced signal is made to be subjected to an integrating equalizing process by the equalizer 107 having such a frequency characteristic as shown in FIG. 6.

Figure 7:
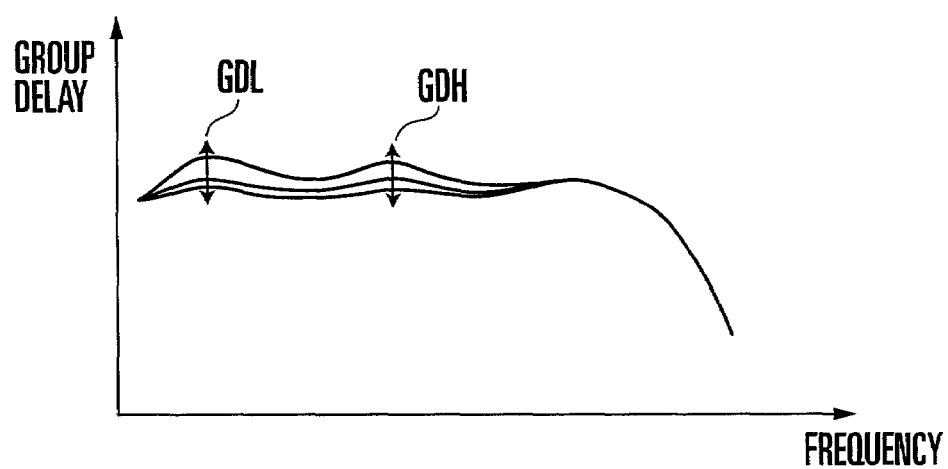
FIG. 7 is a graph showing the group delay characteristic of the entirety of the equalizer shown in FIG. 2.

FIG. 7 is a graph showing the group delay characteristic of the entirety of the equalizer 107. As shown in FIG. 7, the group delay of a low-frequency component and that of a high-frequency component of the reproduced signal are controlled by the all-pass filters 205 and 207, respectively, so that, although there are some ripples, the group delay characteristic which is flat as a whole is realized.

The reproduced signal outputted from the equalizer 107 is converted by the A/D converter 109 into a digital signal composed of a plurality of bits per sample, and is then outputted to an FIR (finite impulse response) filter 111 and a PLL (phase-locked loop) 113.

The PLL 113 generates a clock signal synchronized with the digital signal received from the A/D converter 109, and outputs the clock signal to the A/D converter 109. The A/D converter 109 samples the reproduced signal received from the equalizer 107 according to the clock signal supplied from the PLL 113, and quantizes the reproduced signal with a plurality of bits per sample.

Figure 8:
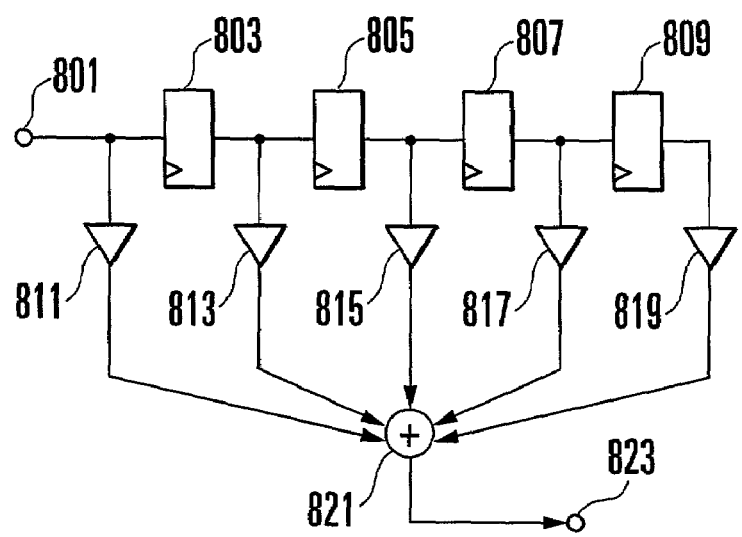
FIG. 8 is a circuit diagram showing the arrangement of an FIR filter included in the VTR shown in FIG. 1.

FIG. 8 is a circuit diagram showing the arrangement of the FIR filter 111.

Referring to FIG. 8, the digital signal received from the A/D converter 109 is supplied to a latch circuit 803 and a coefficient multiplier 811. The latch circuits 803, 805, 807 and 809, which operate according to clock signals supplied from the PLL 113, sequentially hold a digital signal of one sample for one sample clock period and sequentially output the digital signal. The coefficient multiplier 811 multiplies the digital signal from the input terminal 801 by a predetermined coefficient, and outputs the resultant signal to an adder 821, and coefficient multipliers 813, 815, 817 and 819 multiply digital signals outputted from the latch circuits 803, 805, 807 and 809 by predetermined coefficients, respectively, and output the resultant signals to the adder 821. The adder 821 adds together the respective outputs of the coefficient multipliers 811 to 819, and outputs the resultant signal from an output terminal 823.

In the arrangement shown in FIG. 8, the coefficient multiplier 815 corresponds to a center tap coefficient of the FIR filter 111 and has a value of about "1". The other coefficient multipliers 811, 813, 817 and 819 have positive or negative values with "0" set as the center.

Further, when the values of the coefficient multipliers 813 and 817 are simultaneously made negative, the gain of frequencies in the vicinity of "fb/2" (fb being the sampling frequency of the A/D converter 109) increases, and, when the values of the coefficient multipliers 813 and 817 are simultaneously made positive, the gain of frequencies in the vicinity of "fb/2" decreases.

Further, when the coefficients of the coefficient multipliers 811 and 819 are simultaneously made negative, the gain of frequencies in the vicinity of "fb/4" increases, and, when the coefficients of the coefficient multipliers 811 and 819 are simultaneously made positive, the gain of frequencies in the vicinity of "fb/4" decreases.

By varying the coefficients of the coefficient multipliers 813 and 817 or the coefficients of the coefficient multipliers 811 and 819 in an interlocking relation, as mentioned above, it is possible to keep the group delay characteristic in the FIR filter 111 flat. However, by varying the coefficients of the coefficient multipliers 813 and 817 or the coefficients of the coefficient multipliers 811 and 819 independently of each other, it is also possible to make the group delay characteristic in the FIR filter 111 uneven or it is also possible to compensate for the group delay characteristic by utilizing the unevenness thereof.

An output signal of the FIR filter 111 is outputted to a PR4 (partial response class-4) decoder 115.

The PR4 decoder 115 subjects the reproduced signal from the FIR filter 111 to a decoding process for PR4, and then outputs the processed signal to an evaluation circuit 117 and a Viterbi decoder 121.

In the case of the first embodiment, a signal recorded on the tape 101 has been subjected to a preceding process for PR4 as a digital modulating process at the time of recording. The PR4 decoder 115 performs a decoding process for PR4 which is a demodulating process corresponding to the PR4 preceding process applied at the time of recording.

Figure 9:
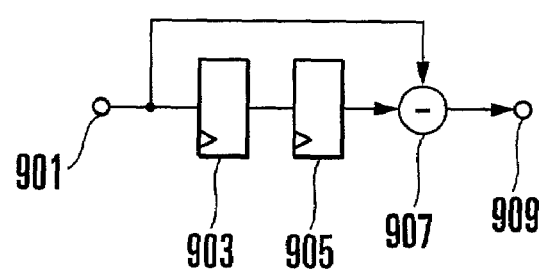
FIG. 9 is a circuit diagram showing the arrangement of a PR4 decoder included in the VTR shown in FIG. 1.

FIG. 9 is a circuit diagram showing the arrangement of the PR4 decoder 115.

Referring to FIG. 9, the reproduced signal from the FIR filter 111, which is inputted at an input terminal 901, is delayed for two clocks by latch circuits 903 and 905 and is then outputted to a subtracter 907. The subtracter 907 finds a difference between the reproduced signal from the input terminal 901 and the signal delayed for two clocks from the latch circuit 905, and outputs the difference to an output terminal 909.

The reproduced signal from the PR4 decoder 115 is outputted to the evaluation circuit 117 and the Viterbi decoder 121.

The evaluation circuit 117 evaluates the characteristic of the equalizer 107 as will be described later, and outputs a result of the evaluation to the equalizer control circuit 119.

The equalizer control circuit 119 controls threshold values for use in the evaluation circuit 117 as will be described later, on the basis of the output of the evaluation circuit 117, and controls the values of the control signals EQC, GDL and GDH to be supplied to the equalizer 107.

The Viterbi decoder 121 detects a digital signal composed of one bit per sample from the output of the PR4 decoder 115 by using a known Viterbi algorithm, and outputs the detected digital signal to a signal processing circuit 123.

The signal processing circuit 123 processes a reproduced video signal and a reproduced audio signal on the basis of the digital signal obtained by the Viterbi decoder 121, and outputs the processed signals from an output terminal 125. In the digital VTR according to the first embodiment, since a video signal and an audio signal which are coded are recorded and reproduced, the signal processing circuit 123 includes a decoding circuit for decoding the video signal and the audio signal.

Next, the evaluation circuit 117 will be described in detail.

Figure 10:
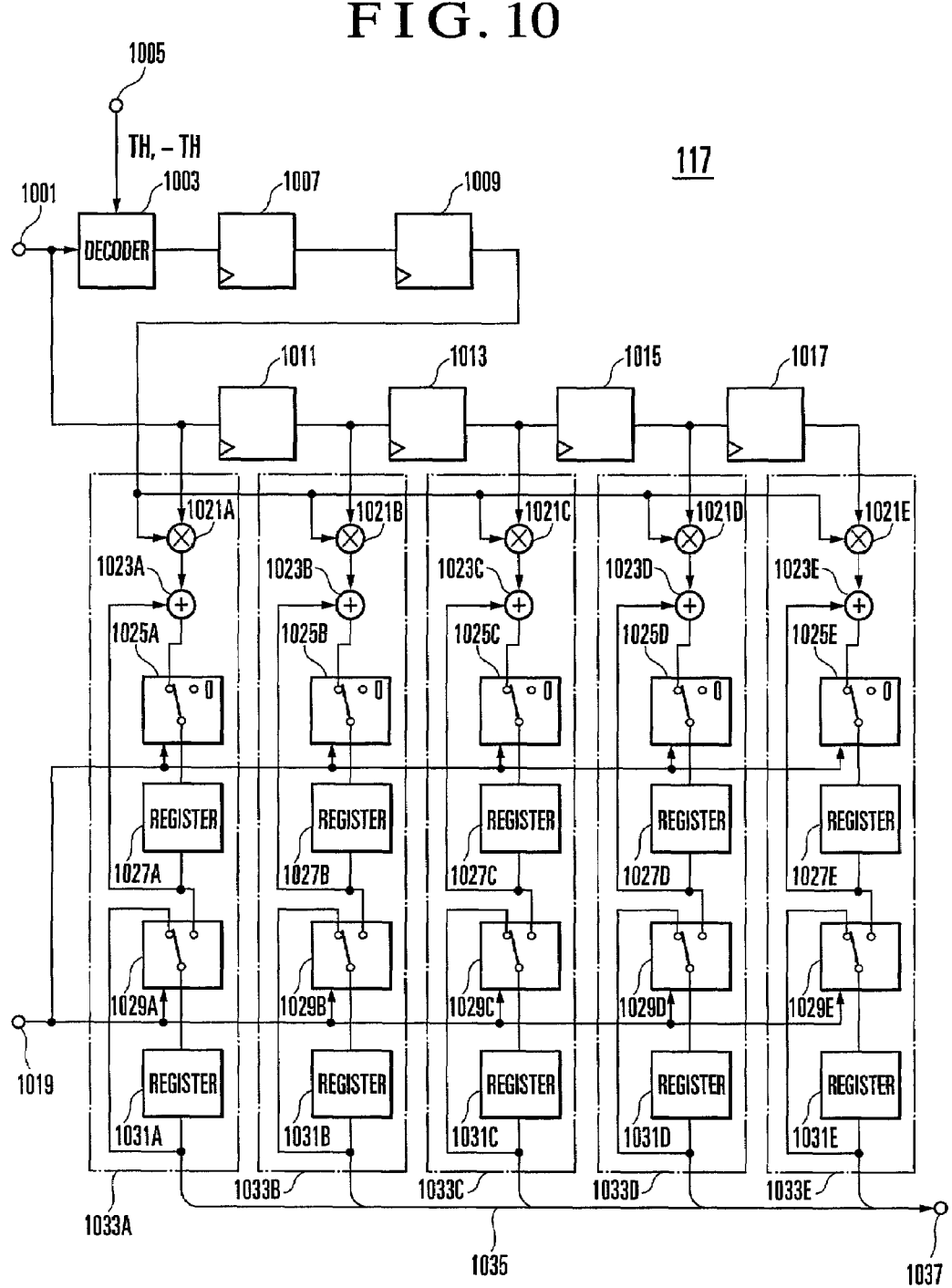
FIG. 10 is a circuit diagram showing the arrangement of an evaluation circuit included in the VTR shown in FIG. 1.

FIG. 10 is a circuit diagram showing the arrangement of the evaluation circuit 117.

Referring to FIG. 10, the reproduced signal outputted from the PR4 decoder 115 is supplied from an input terminal 1001 to a decoder 1003 and a latch circuit 1011.

The decoder 1003 compares the inputted reproduced signal with threshold values TH and −TH to detect a digital signal by means of a three-value detecting method. More specifically, if the level of the PR4 signal supplied from the PR4 decoder 115 is larger than the threshold value TH, the decoder 1003 detects a digital signal as "1". If the level of the PR4 signal is smaller than the threshold value −TH, the decoder 1003 detects a digital signal as "−1". If the level of the PR4 signal is a value between the threshold values −TH and TH, the decoder 1003 detects a digital signal as "0". Further, the threshold values TH and −TH are controlled by a control signal inputted to an input terminal 1005 from the equalizer control circuit 119.

Three-value-detected data obtained by the decoder 1003 is delayed sequentially by latch circuits 1007 and 1009 each for one clock period, and is then outputted to multipliers 1021A to 1021E. The multipliers 1021A to 1021E respectively constitute parts of detection circuits 1033A to 1033E shown in FIG. 10. The detection circuits 1033A to 1033E are arranged to operate in the same manner except that the amount of delay of the inputted data differs. Therefore, in the following description, only the detection circuit 1033A is explained, while the other detection circuits 1033B to 1033E are omitted from the description.

On the other hand, the PR4 signal inputted from the input terminal 1001 is delayed sequentially by latch circuits 1011, 1013, 1015 and 1017 each for one clock period, and is then outputted from the latch circuits 1011, 1013, 1015 and 1017 respectively to multipliers 1021B to 1021E of the respective detection circuits 1033B to 1033E.

Here, in the first embodiment, data inputted to the latch circuit 1011 and data outputted from the respective latch circuits 1011 to 1017 are referred to respectively as data D+2, D+1, D0, D−1 and D−2, for the sake of convenience. Then, with data D0 assumed to be the center of a time axis, detection data delayed for two clock periods by the latch circuits 1007 and 1009 can be considered to be a three-value-detected result of the data D0.

The multiplier 1021A multiplies the inputted PR4 signal by the three-value-detected result delayed for two clock periods by the latch circuit 1009, and outputs a result of the multiplication to an integration circuit composed of an adder 1023A, a switch 1025A and a register 1027A. The contact piece of the switch 1025A is normally connected to the side of the adder 1023A, as shown in FIG. 10, and is, according to a timing signal supplied from an input terminal 1019, connected to the side opposite to the side of the adder 1023A, for example, once for 2048 clock periods so as to clear the value of the register 1027A.

The contact piece of a switch 1029A is normally connected to the output side of a register 1031A, and is, according to the timing signal supplied from the input terminal 1019, connected to the side of the register 1027A once for 2048 clock periods in association with the switch 1025A so as to store a result of the integration of the register 1027A. The register 1031A is connected to a bus 1035, and a microcomputer included in the equalizer control circuit 119 is able to read out data of the register 1031A through the bus 1035 at a predetermined timing which is asynchronous with the connection timing of the switch 1029A.

While, in the first embodiment, each of the switches 1025A and 1029A is switched over every 2048 clock periods so as to store a result of the integration in the register 1031A, the switch-over timing of the switches 1025A and 1029A may be changed to other than the 2048 clock periods.

More specifically, if each of the switches 1025A and 1029A is controlled to be switched over once for one track period, it is possible to obtain a result of the integration for every track. However, this control allows the equalizing characteristic to be corrected only once for one track, and causes the number of bits of a register constituting the integration circuit to become large. In the first embodiment, on the other hand, a clock signal of 41.85 MHz is obtained from the reproduced signal by the PLL 113, and an integrating operation is performed in units of 2048 clock periods. Accordingly, the microcomputer included in the equalizer control circuit 119 is enabled to read a result of the integration several times for one track period at an adequate timing.

This arrangement makes it possible to watch the manner of a signal waveform of each of a plurality of portions into which one track is divided, so that it is possible to perform the finer control of the equalizing characteristic.

Next, the significance of each detection data obtained by the evaluation circuit 117 shown in FIG. 10 in the first embodiment will be described.

First, to the detection circuit 1033C, there are supplied a detection result detected by the decoder 1003 and delayed for two clock periods and a PR4 signal inputted from the input terminal 1001 and delayed for two clock periods. Thus, the PR4 signal and the three-value-detected result which are obtained at the same timing in terms of time are supplied to the detection circuit 1033C.

Therefore, the detection circuit 1033C is arranged to integrate a result of the multiplication obtained by multiplying a value of the PR4 signal itself before the three-value detection by the three-value-detected result. This result of the integration corresponds to a degree of correlation between the PR4 signal waveform-equalized by the equalizer 107 and the output of the decoder 1003 which is an actual detection result, and is data reflecting the very level of the PR4 signal.

To the detection circuit 1033D, there are supplied a three-value-detected result delayed for two clock periods and a PR4 signal delayed for three clock periods. The multiplier 1021D outputs the PR4 signal corresponding to the data D−1, as it is, when the data D0 as the detection result is "1", and outputs a signal obtained by inverting the sign of the value of the PR4 signal corresponding to the data D−1, when the data D0 is "−1". As a detection result of the detection circuit 1033D, there is obtained a result of the integration of the PR4 signal corresponding to the data D−1 when the data D0 is "1" or "−1". This detection result also indicates the level of a frequency component of "fb/2" included in a signal equalized by the equalizer 107.

To the detection circuit 1033B, there are supplied a three-value-detected result delayed for two clock periods and a PR4 signal delayed for one clock period. The multiplier 1021B outputs the PR4 signal corresponding to the data D+1, as it is, when the data D0 as the detection result is "1", and outputs a signal obtained by inverting the sign of the value of the PR4 signal corresponding to the data D+1, when the data D0 is "−1". As a detection result of the detection circuit 1033B, there is obtained a result of the integration of the PR4 signal corresponding to the data D+1 when the data D0 is "1" or "−1". This detection result also indicates the level of a frequency component of "fb/2" included in a signal equalized by the equalizer 107, similarly to the output of the detection circuit 1033D, although there is a difference due to detection results obtained before and after the data D0 in terms of time. By using the outputs of the detection circuits 1033B and 1033D, it is possible to grasp the manner of a waveform equalized by the equalizer 107.

Next, to the detection circuit 1033E, there are supplied a three-value-detected result delayed for two clock periods and a PR4 signal delayed for four clock periods. The multiplier 1021E outputs the PR4 signal corresponding to the data D−2, as it is, when the data D0 as the detection result is "1", and outputs a signal obtained by inverting the sign of the value of the PR4 signal corresponding to the data D−2, when the data D0 is "−1". As a detection result of the detection circuit 1033E, there is obtained a result of the integration of the PR4 signal corresponding to the data D−2 when the data D0 is "1" or "−1". This detection result also indicates the level of a frequency component of "fb/4" included in a signal equalized by the equalizer 107.

Further, to the detection circuit 1033A, there are supplied a three-value-detected result delayed for two clock periods and a PR4 signal not delayed. The multiplier 1021A outputs the PR4 signal corresponding to the data D+2, as it is, when the data D0 as the detection result is "1", and outputs a signal obtained by inverting the sign of the value of the PR4 signal corresponding to the data D+2, when the data D0 is "−1". As a detection result of the detection circuit 1033A, there is obtained a result of the integration of the PR4 signal corresponding to the data D+2 when the data D0 is "1" or "−1". This detection result also indicates the level of a frequency component of "fb/4" included in a signal equalized by the equalizer 107, similarly to the output of the detection circuit 1033E, although there is a difference due to detection results obtained before and after the data D0 in terms of time. By using the outputs of the detection circuits 1033A and 1033E, it is possible to grasp the manner of a waveform equalized by the equalizer 107.

Next, the operation of the equalizer control circuit 119 using the above-mentioned outputs of the evaluation circuit 117 will be described.

The equalizer control circuit 119 inputs the outputs of the evaluation circuit 117 to the microcomputer incorporated in the evaluation circuit 117, and judges the status of the equalizing operation of the equalizer 107 on the basis of the outputs of the detection circuits 1033A to 1033E. Then, according to a result of the judgment, the equalizer control circuit 119 changes the values of the control signals EQC, GDL and GDH to be supplied to the equalizer 107. This arrangement makes it possible to realize an optimum equalizing characteristic.

Figure 11A:
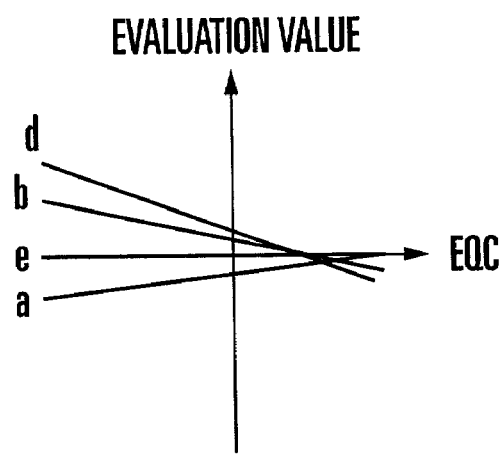
FIGS. 11(a) to 11(c) are graphs showing the manner of control of the characteristic of the equalizer by outputs of the evaluation circuit shown in FIG. 10.
Figure 11B:
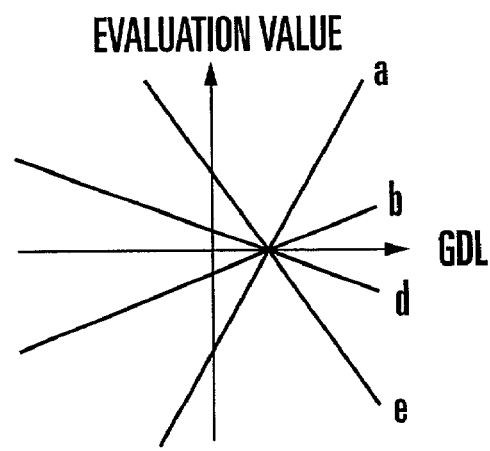
Figure 11C:
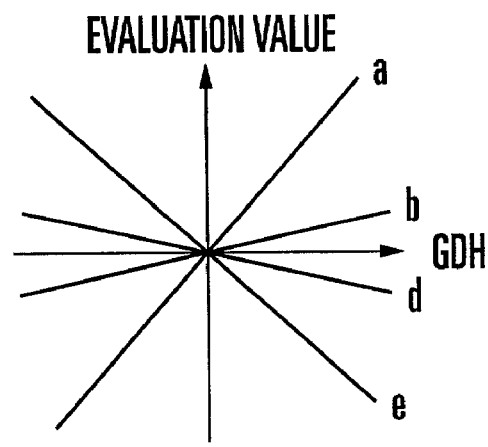

FIGS. 11(a) to 11(c) show the conditions of detection results outputted from the detection circuits 1033A to 1033E of the evaluation circuit 117 when the values of the control signals EQC, GDL and GDH to be supplied to the equalizer 107 are varied while a signal is actually being reproduced from a tape.

In FIGS. 11(a) to 11(c), the outputs of the detection circuits 1033A, 1033B, 1033D and 1033E are represented by "a", "b", "d" and "e", respectively. Further, in FIGS.

11(a) to 11(c), the abscissa axis indicates a voltage of each of the control signals EQC, GDL and GDH to be supplied to the equalizer 107, in which the closer to the right the position on the abscissa axis is, the higher the voltage becomes. The ordinate axis indicates a detection output (hereinafter referred to as an evaluation value) of each of the detection circuits 1033A to 1033E, in which, with the center being "0", the closer to the upper side the position on the ordinate axis is, the larger the evaluation value becomes.

Referring to FIGS. 11(a) to 11(c), if the value of the control signal EQC is heightened, in particular, the evaluation values "d" and "b" decrease, as shown in FIG. 11(a). If the value of the control signal GDH is heightened, in particular, the evaluation value "a" increases and the evaluation value "e" decreases, as shown in FIG. 11(c). Further, the evaluation value "b" somewhat increases and the evaluation value "d" somewhat decreases. If the value of the control signal GDL is heightened, the evaluation values "a" and "b" increase and the evaluation values "e" and "d" decrease, as shown in FIG. 11(b), in the same way as in the case of the control signal GDH. However, since the control signal GDL is used for equalizing the group delay of a low-frequency band as compared with the control signal GDH, an extent to which the evaluation values "a" and "b" are interlocked with each other is larger than in the case of controlling the control signal GDH.

In the first embodiment, on the basis of the evaluation values "a" to "e" outputted from the evaluation circuit 117, the values of the control signals EQC, GDL and GDH are controlled in such a way as to cause each of the evaluation values "a" to "e" to become "0".

Next, the control operation of the equalizer control circuit 119 based on the above-mentioned outputs of the evaluation circuit 117 will be described with reference to the flow chart of FIG. 12.

Figure 12:
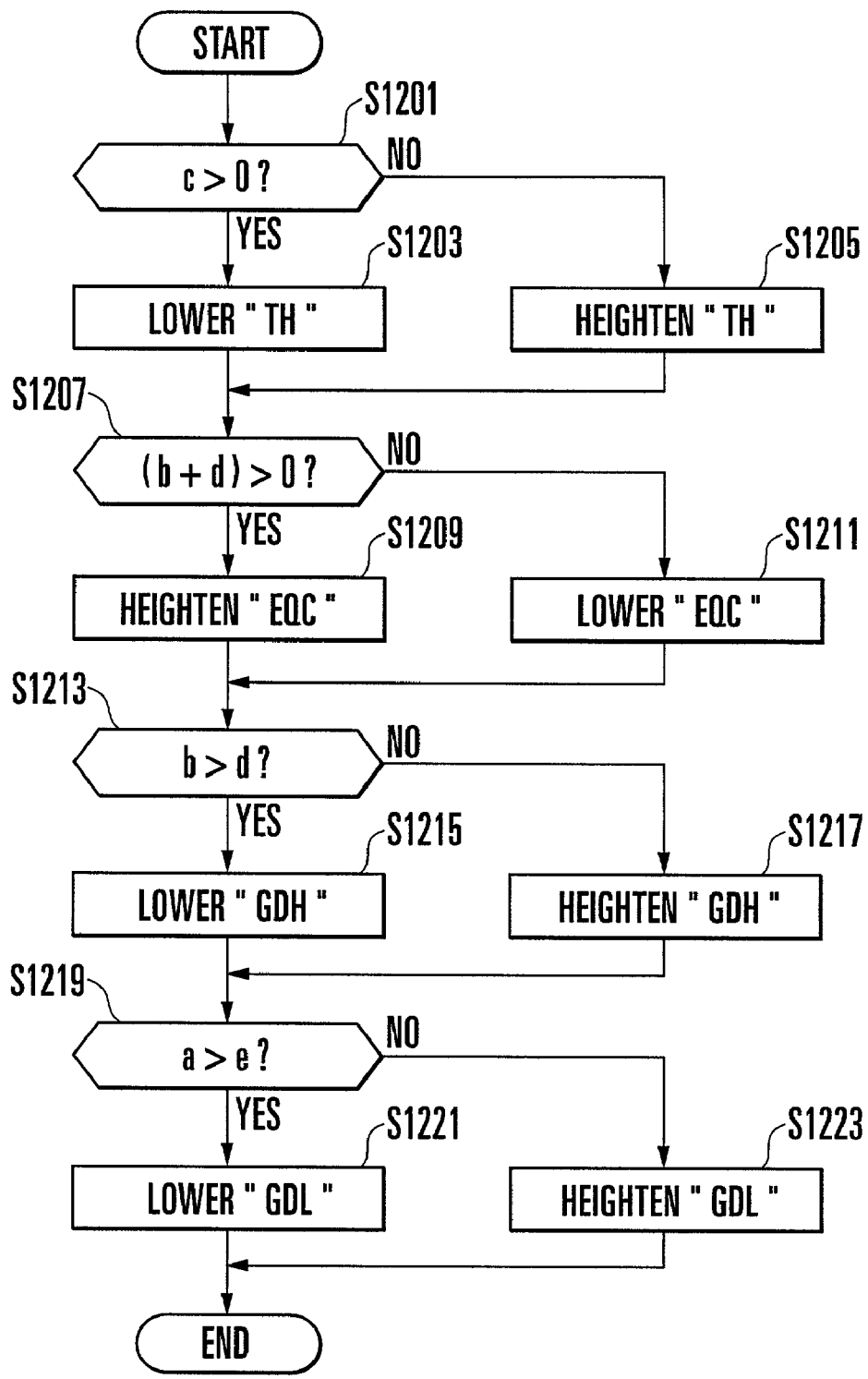
FIG. 12 is a flow chart for explaining the operation of an equalizer control circuit included in the VTR shown in FIG. 1.

FIG. 12 is a flow chart for explaining the processing operation of the microcomputer incorporated in the equalizer control circuit 119.

During the process of reproducing a signal from a tape, a processing loop shown in FIG. 12 is repeatedly executed at a predetermined timing.

First, in step S1201, the microcomputer incorporated in the equalizer control circuit 119 makes a check to find if the evaluation value "c" read out from the evaluation circuit 117 is larger than "0". If the evaluation value "c" is larger than "0", the procedure proceeds to step S1203. In the step S1203, the microcomputer controls the evaluation circuit 117 in such a way as to lower the absolute value of each of the threshold values TH and −TH of the decoder 1003 by a predetermined value. On the other hand, if the evaluation value "c" is smaller than "0", the procedure proceeds to step S1205. In the step S1205, the microcomputer controls the evaluation circuit 117 in such a way as to heighten the absolute value of each of the threshold values TH and −TH of the decoder 1003 by a predetermined value.

More specifically, in the first embodiment, since, if the detection value of the detection circuit 1033C indicative of the correlation between the equalization result by the equalizer 107 and the detection result is not in the vicinity of "0", errors occur in the detection results by the other detection circuits 1033A, 1033B, 1033D and 1033E, the threshold values to be given to the decoder 1003 are adjusted so as to match the level of the output signal of the equalizer 107 corresponding to the above-mentioned data D0 with an appropriate level. Incidentally, while, in the first embodiment, the level of the output signal of the equalizer 107 is made to match with an appropriate level by adjusting the threshold values of the decoder 1003, the level of the input signal itself to the evaluation circuit 117 may be controlled instead, having the same effect.

Next, in step S1207, the microcomputer makes a check to find if a result of addition of the evaluation values "b" and "d" read out from the evaluation circuit 117 is larger than "0". If the addition result is larger than "0", the procedure proceeds to step S1209. In the step S1209, the microcomputer heightens the value of the control signal EQC by a predetermined amount. On the other hand, if the addition result is smaller than "0", the procedure proceeds to step S1211. In the step S1211, the microcomputer lowers the value of the control signal EQC by a predetermined amount.

Next, in step S1213, the microcomputer compares the evaluation value "b" with the evaluation value "d". If the evaluation value "b" is larger than the evaluation value "d", the procedure proceeds to step S1215. In the step S1215, the microcomputer lowers the value of the control signal GDH by a predetermined amount. If the evaluation value "b" is smaller than the evaluation value "d", the procedure proceeds to step S1217. In the step S1217, the microcomputer heightens the value of the control signal GDH by a predetermined amount.

Next, in step S1219, the microcomputer compares the evaluation value "a" with the evaluation value "e". If the evaluation value "a" is larger than the evaluation value "e", the procedure proceeds to step S1221. In the step S1221, the microcomputer lowers the value of the control signal GDL by a predetermined amount. If the evaluation value "a" is smaller than the evaluation value "e", the procedure proceeds to step S1223. In the step S1223, the microcomputer heightens the value of the control signal GDL by a predetermined amount.

The signal waveform to be obtained when the group delay characteristic of the equalizer 107 is controlled on the basis of the outputs of the evaluation circuit 117 will be described below.

Figure 13:
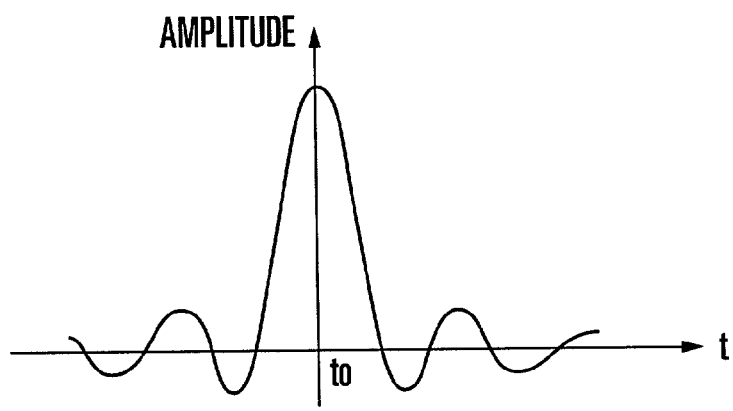
FIG. 13 is a graph for explaining the operation of the equalizer included in the VTR shown in FIG. 1.

FIG. 13 is a graph showing the waveform of an output signal of the equalizer 107, in a case where the equalizing characteristic of the equalizer 107 is set optimum, when an impulse waveform is inputted to the equalizer 107. As shown in FIG. 13, in a case where the equalizing characteristic of the equalizer 107 is set appropriate, the output waveform of the equalizer 107 becomes laterally symmetrical.

Figure 14A:
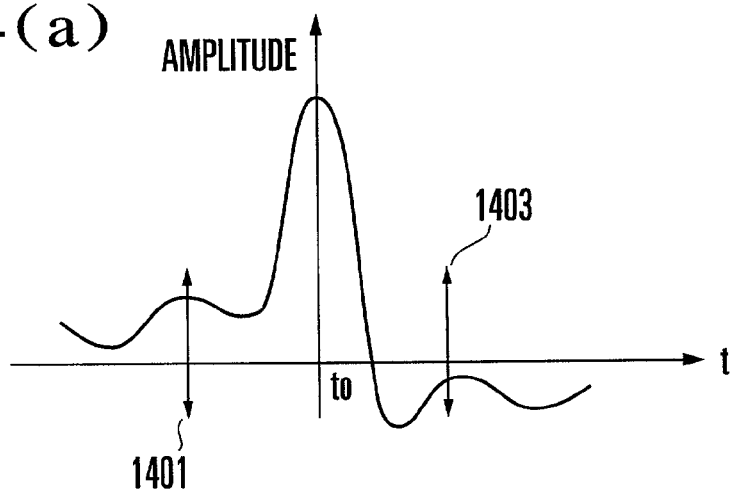
FIGS. 14(a) and 14(b) are graphs for explaining the control operation of the equalizer according to the first embodiment.
Figure 14B:
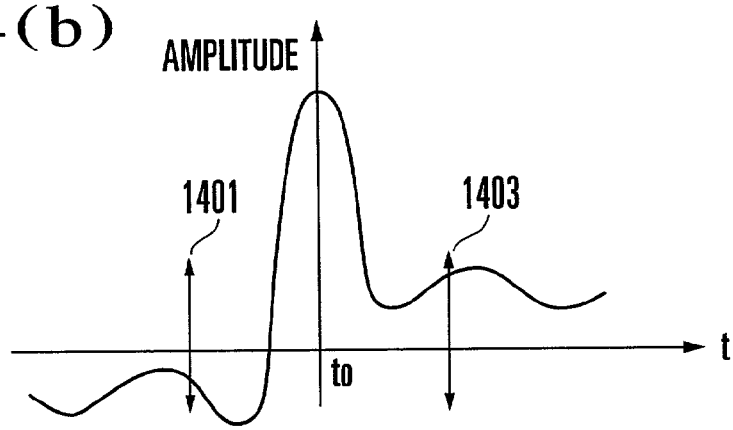

FIGS. 14(a) and 14(b) each show the manner of the output waveform of the equalizer 107 which has become asymmetrical with respect to a point of time t0 because the equalizing characteristic of the equalizer 107 is not optimum. In the first embodiment, the group delay characteristic of a low-frequency band of the equalizer 107 is controlled by controlling the control signal GDL, so that the output waveform is controlled as indicated by arrows 1401 and 1403 shown in FIGS. 14(a) and 14(b).

The levels of portions indicated by the arrows 1401 and 1403 before and after the point of time t0 in FIGS. 14(a) and 14(b) correspond to the evaluation values "a" and "e" of the evaluation circuit 117, respectively. In other words, the detection circuits 1033A and 1033E shown in FIG. 10 are arranged to respectively integrate the levels of the data D+2 and D−2 obtained when such impulse data as to make the data D0 be "1" or "−1" as shown in FIG. 13 has been inputted, and the evaluation values "a" and "e" indicate the levels obtained in the vicinity of the frequency "fb/4" when such an impulse waveform has been inputted. Then, as shown in FIG. 11(b), when the value of the control signal GDL is varied, the evaluation values "a" and "e" change in the respective opposite directions.

Accordingly, by controlling the group delay characteristic of a low-frequency band of the equalizer 107 by means of the control signal GDL, it is possible to cause the impulse waveform shown in FIG. 14(a) or 14(b) to become akin to the waveform shown in FIG. 13.

Figure 15A:
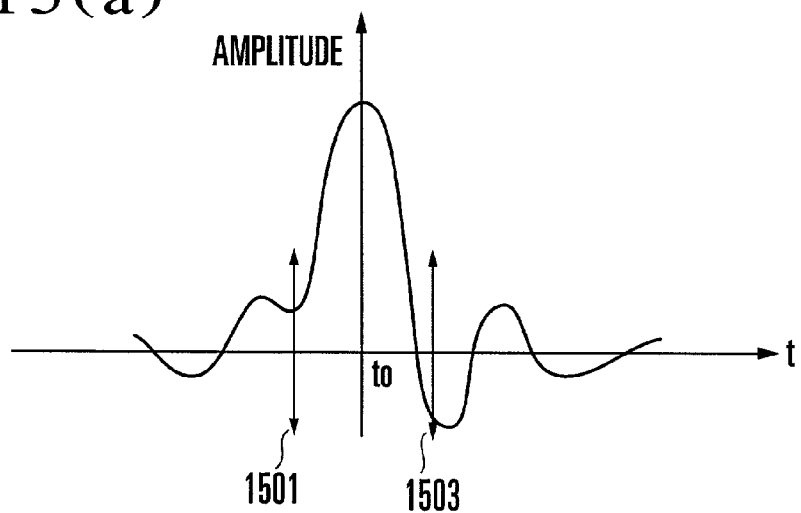
FIGS. 15(a) and 15(b) are graphs for explaining the control operation of the equalizer according to the first embodiment.
Figure 15B:
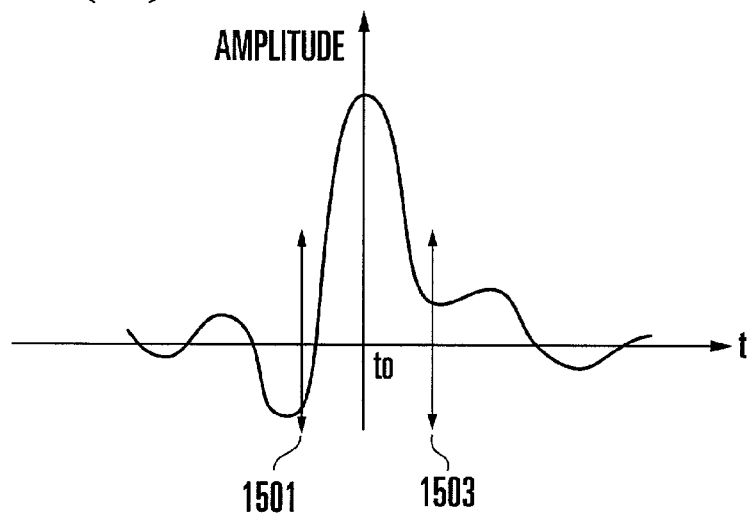

FIGS. 15(a) and 15(b) each also show, similarly to FIGS. 14(a) and 14(b), the manner of the output waveform of the equalizer 107 which has become asymmetrical with respect to a point of time t0 because the equalizing characteristic of the equalizer 107 is not optimum.

The levels of portions indicated by arrows 1501 and 1503 before and after the point of time t0 in FIGS. 15(a) and 15(b) correspond to the evaluation values "b" and "d" of the evaluation circuit 117, respectively. In other words, the detection circuits 1033B and 1033D shown in FIG. 10 are arranged to respectively integrate the levels of the data D+1 and D−1 obtained when such impulse data as to make the data D0 be "1" or "−1" as shown in FIG. 13 has been inputted, and the evaluation values "b" and "d" indicate the levels obtained in the vicinity of the frequency "fb/2" when such an impulse waveform has been inputted. Then, as shown in FIG. 11(c), when the value of the control signal GDH is varied, the evaluation values "b" and "d" change in the respective opposite directions.

Accordingly, by controlling the group delay characteristic of a high-frequency band of the equalizer 107 by means of the control signal GDH, portions of the waveform nearer to the point of time t0 than those shown in FIGS. 14(a) and 14(b) are controlled as indicated by the arrows 1501 and 1503, so that it is possible to cause the impulse waveform shown in FIG. 15(a) or 15(b) to become akin to the waveform shown in FIG. 13.

Further, while the separate waveforms are illustrated in FIGS. 14(a) and 14(b) and FIGS. 15(a) and 15(b), respectively, to explain the control operations using the control signals GDL and GDH independently of each other, in actuality, the evaluation values "a", "b", "d" and "e" are varied by each of the control signals GDL and GDH as shown in FIGS. 11(b) and 11(c), and the actual equalized waveform is the one obtained by combining the waveform shown in FIGS. 14(a) and 14(b) and the waveform shown in FIGS. 15(a) and 15(b) with each other.

As described above, according to the first embodiment, the correlation between a PR4 signal subjected to an equalizing process by the equalizer 107 and a detection result obtained by the decoder 1003 included in the evaluation circuit 117 is obtained, and a group delay characteristic of the equalizer 107 is controlled on the basis of the obtained correlation. Accordingly, it is possible to control the equalizer 107 in such a way as to compensate for equalization errors of the equalizer 107 itself without depending on an error rate.

Therefore, even in a state in which an error rate is extremely low, it is possible to accurately control the equalizing characteristic. Further, it is possible to control the equalizing characteristic to an original optimum value without causing a change of the equalizing characteristic to follow a change of the error rate due to physical factors such as a dropout or the like.

Incidentally, while, in the first embodiment, the amplitude characteristic and the group delay characteristic of the equalizer 107 are controlled according to the output of the evaluation circuit 117, instead of this arrangement, for example, the coefficients of the FIR filter 111 may be controlled.

Assuming that the coefficients of the coefficient multipliers 811, 813, 815, 817 and 819 of the FIR filter 111 shown in FIG. 8 are denoted by A, B, C, D and E, respectively, the manners of the evaluation values "a", "b", "d" and "e" obtained when the coefficients A, B, D and E are varied are shown in FIGS. 16(a) to 16(d).

Figure 16A:
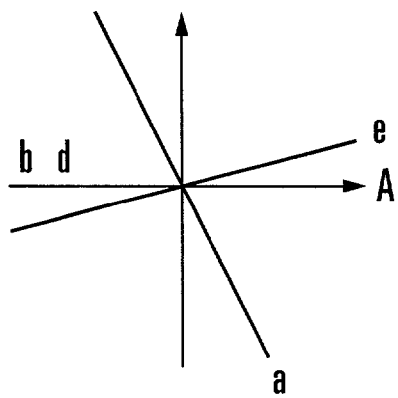
FIGS. 16(a) to 16(d) are graphs for explaining the control operation of the FIR filter according to the first embodiment.
Figure 16B:
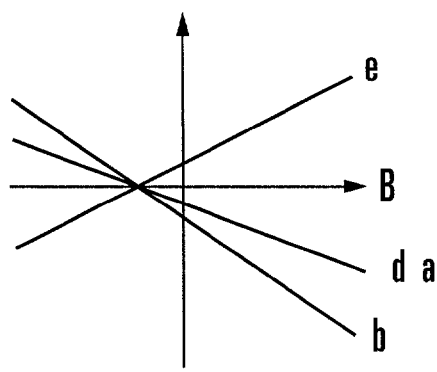
Figure 16C:
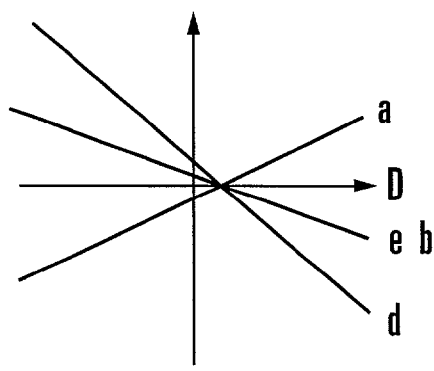
Figure 16D:
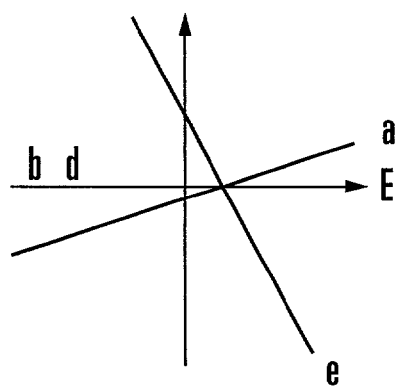

As shown in FIG. 16(a), if the coefficient A is heightened, the evaluation value "a" decreases. If the coefficient B is heightened, the evaluation value "b" decreases and the evaluation value "e" increases, as shown in FIG. 16(b). The coefficient C is used to adjust the gain of the FIR filter 111. If the coefficient D is heightened, the evaluation value "d" decreases and the evaluation value "a" increases, as shown in FIG. 16(c). Further, if the coefficient E is heightened, the evaluation value "e" decreases, as shown in FIG. 16(d). Then, if the coefficients of the FIR filter 111 are controlled according to the flow chart of FIG. 12, it is possible to equalize the waveform of a reproduced signal in the way similar to a case where the equalizer 107 is controlled.

In addition, it is possible to combine two control operations, for example, a control operation of controlling the group delay characteristic of the equalizer 107 according to the control signals GDL and GDH and a control operation of controlling the level of a reproduced signal according to the coefficient C of the FIR filter 111.

Further, while, in the evaluation circuit 117, the decoder 1003 performs a three-value detecting method as mentioned in the foregoing, the other various detecting methods may be used, for example, a Viterbi decoder may be used for detection.

Next, a second embodiment of the invention will be described.

The second embodiment is arranged to use a first control algorithm for controlling an equalizer on the basis of an evaluation value and a second control algorithm for controlling the equalizer on the basis of an error rate of a reproduced signal.

In the second embodiment to be described in the following, the invention is also applied to a digital VTR (video tape recorder).

Figure 17:
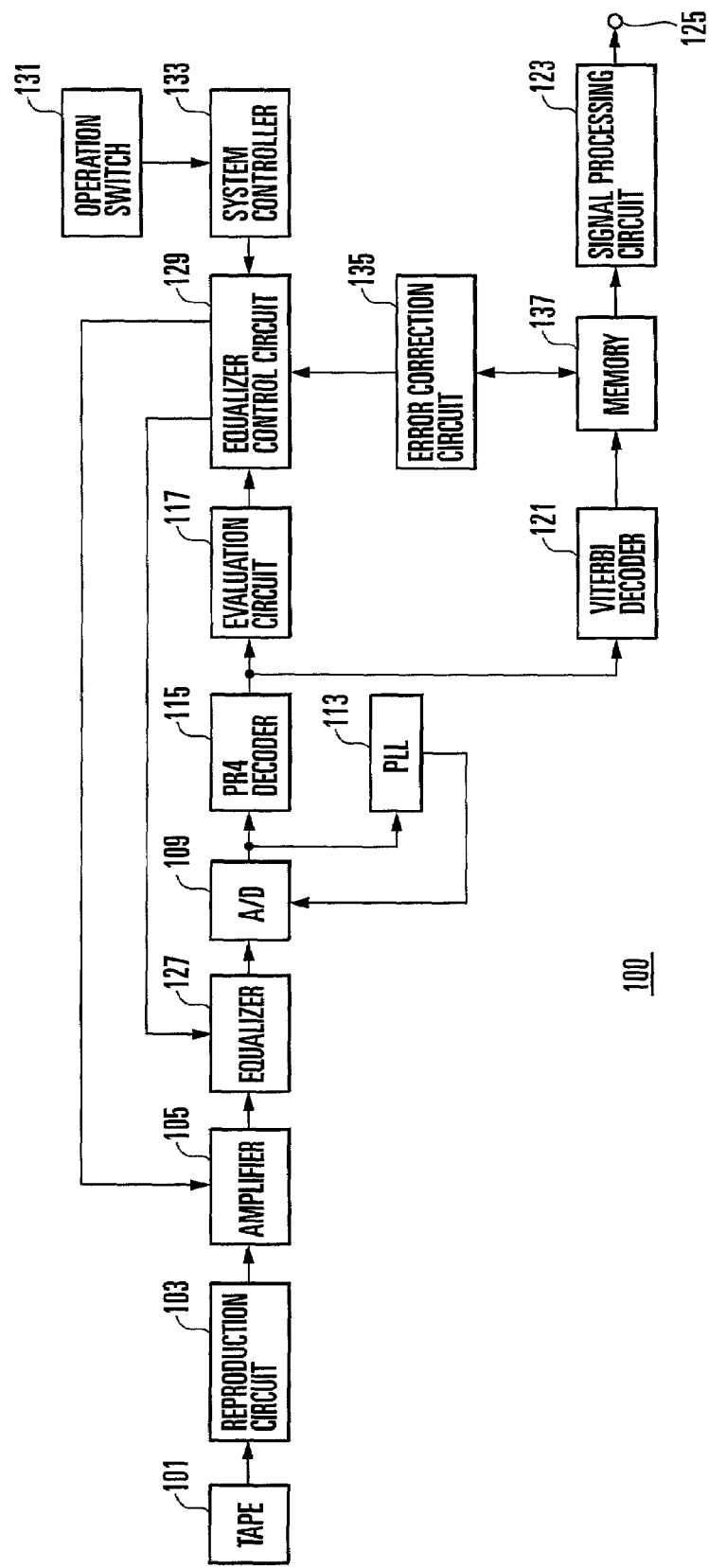
FIG. 17 is a block diagram showing the arrangement of a video tape recorder (VTR) according to a second embodiment of the invention.

FIG. 17 is a block diagram showing the arrangement of a reproducing system of a video tape recorder (VTR) 100 according to the second embodiment. In FIG. 17, the same parts as those shown in FIG. 1 are denoted by the same reference numerals as in FIG. 1.

Referring to FIG. 17, a reproduction circuit 103 reproduces, by means of a rotary head, an information signal, such as a video signal, an audio signal, a sub-code signal, etc., from a number of helical tracks formed on a tape 101, and outputs the reproduced information signal to an amplifier 105. The amplifier 105 amplifies the reproduced signal received from the reproduction circuit 103, and outputs the amplified signal to an equalizer 127.

The equalizer 127, similarly to the equalizer 107 shown in FIG. 1, equalizes the reproduced signal received from the amplifier 105 in such a way as to compensate for any deterioration of the reproduced signal due to an electromagnetic conversion system, and outputs the equalized signal to an A/D converter 109.

Figure 18:
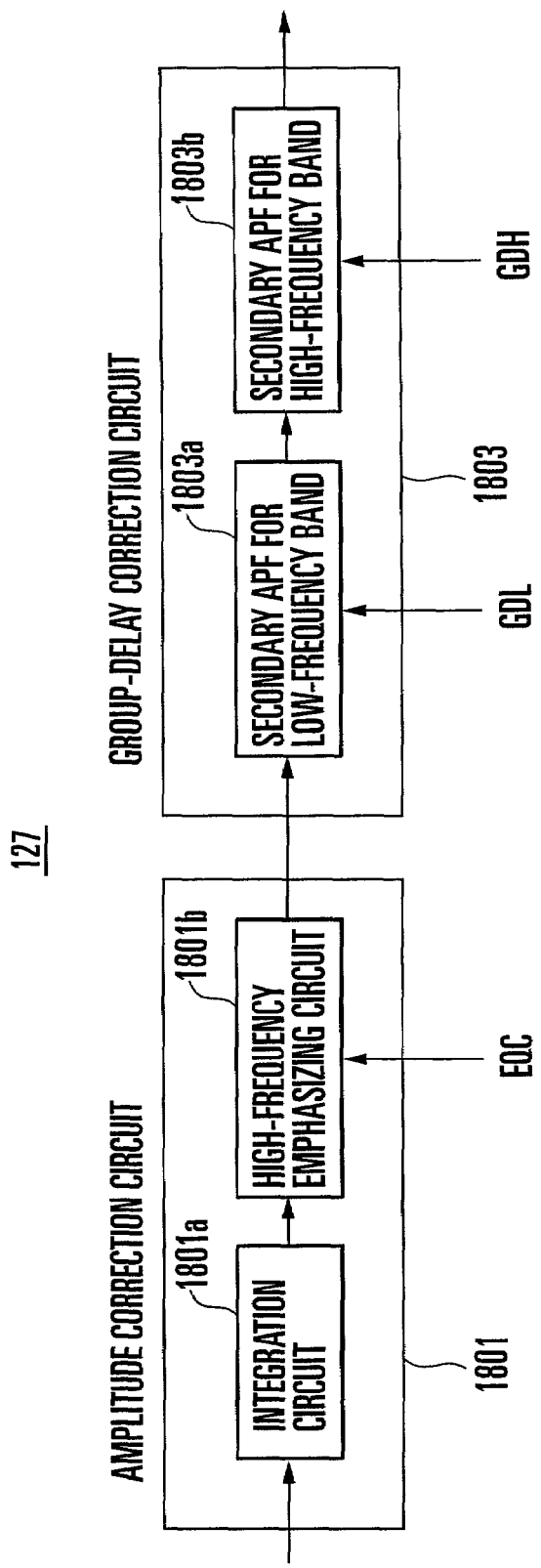
FIG. 18 is a block diagram showing the arrangement of an equalizer included in the VTR shown in FIG. 17.

FIG. 18 is a circuit diagram showing the arrangement of the equalizer 127.

The equalizer 127 in the second embodiment includes, as shown in FIG. 18, an amplitude correction circuit 1801 and a group-delay correction circuit 1803. The amplitude correction circuit 1801 is composed of an integration circuit 1801a for correcting mainly the amplitude of a low-frequency band, and a high-frequency emphasizing circuit 1801b. The group-delay correction circuit 1803 is composed of a secondary all-pass filter (hereinafter referred to as APF) 1803a for correcting the group delay of a low-frequency band, and a secondary APF 1803b for correcting the group delay of a high-frequency band.

Then, the characteristic of the high-frequency emphasizing circuit 1801b is controllable according to a control signal EQC. In addition, the characteristic of the APF 1803a and the characteristic of the APF 1803b are controllable according to control signals GDL and GDH, respectively.

Figure 19:
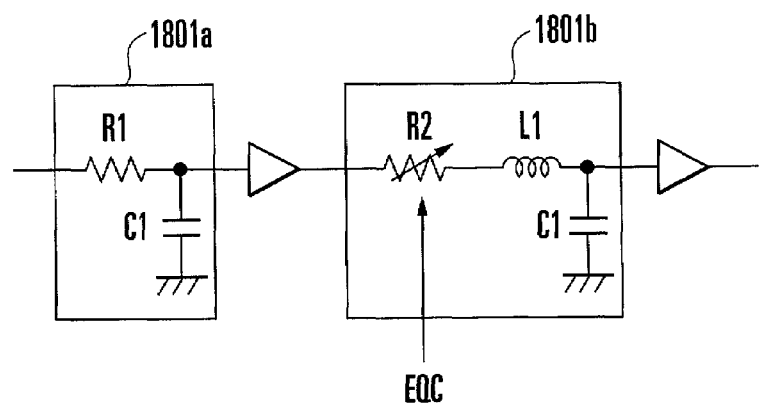
FIGS. 19(a) and 19(b) are circuit diagrams showing the details of the arrangement of the equalizer shown in FIG. 18.
Figure 19:
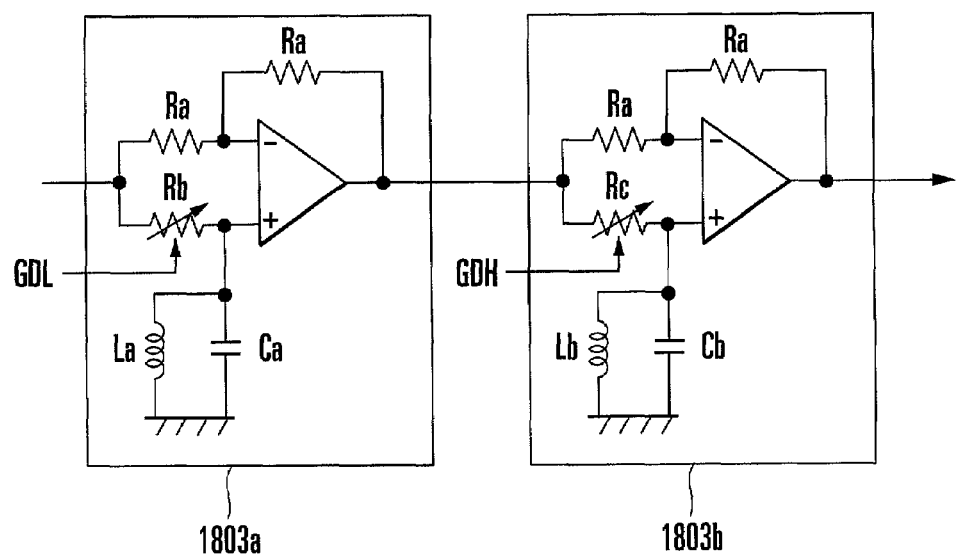

The arrangement of the amplitude correction circuit 1801 and the arrangement of the group-delay correction circuit 1803 shown in FIG. 18 are shown in FIGS. 19(a) and 19(b). Further, the equalizing characteristic of the amplitude correction circuit 1801 is shown in FIG. 20, and the equalizing characteristic of the group-delay correction circuit 1803 is shown in FIG. 21.

Figure 20:
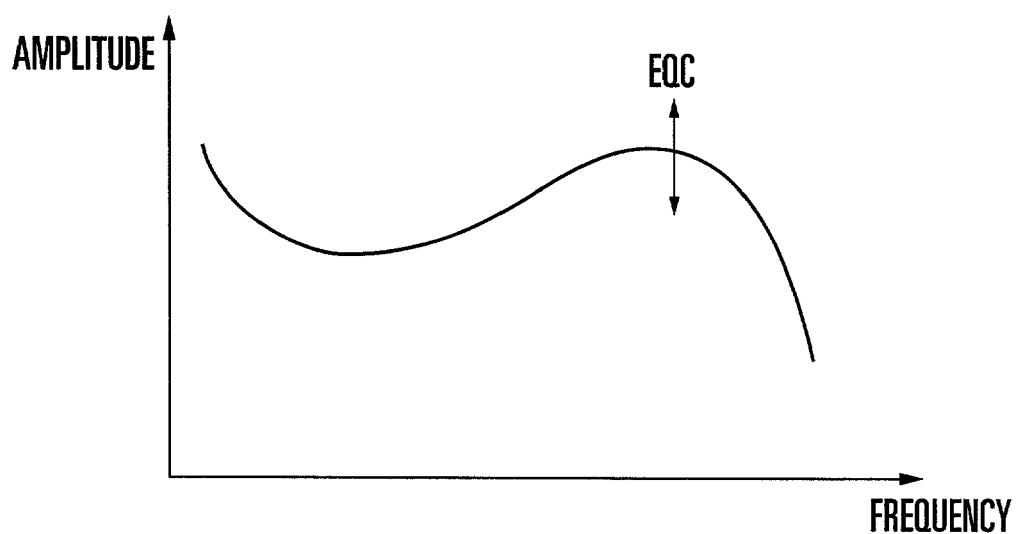
FIG. 20 is a graph showing the amplitude characteristic of the equalizer shown in FIG. 18.
Figure 21:
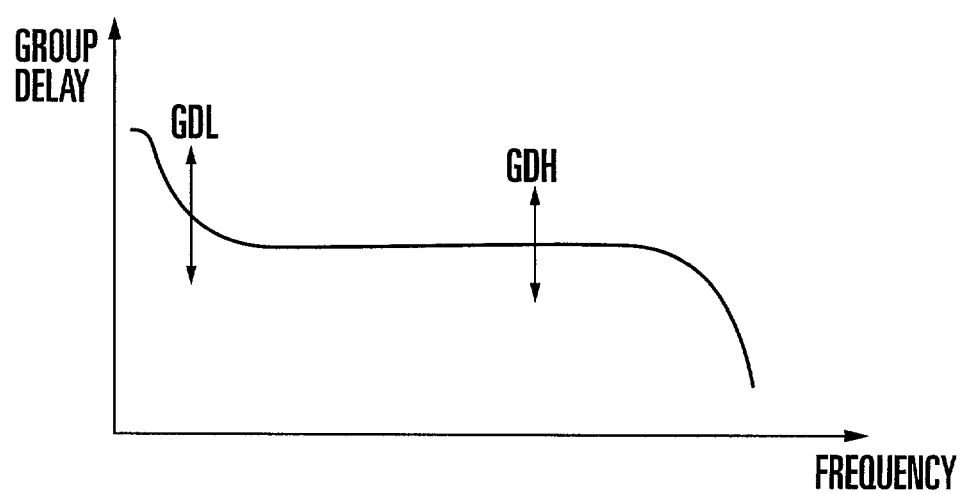
FIG. 21 is a graph showing the group delay characteristic of the equalizer shown in FIG. 18.

By controlling the value of a variable resistor R2 of the high-frequency emphasizing circuit 1801b shown in FIG. 19(a) according to the control signal EQC, the amount of emphasis of a high-frequency component can be controlled as shown in FIG. 20.

Further, the group delay characteristic of a secondary all-pass filter can be expressed by the following equation:

$$t(f) = \frac{\left(f \times f - \frac{fa}{Q} \times f + fa \times fa\right)}{\left(f \times f + \frac{fa}{Q} \times f + fa \times fa\right)}$$

Then, by adjusting factors Q and fa, it is possible to realize a group delay characteristic as aimed at.

For example, in the secondary APF, since the factors fa and Q are expressed by the following equations:

$$fa = \frac{1}{2\pi\sqrt{LC}}$$

$$Q = (fa \times CR),$$

it becomes possible to change the factors fa and Q by adjusting L (inductance), C (capacitance) and R (resistance).

Figure 22A:
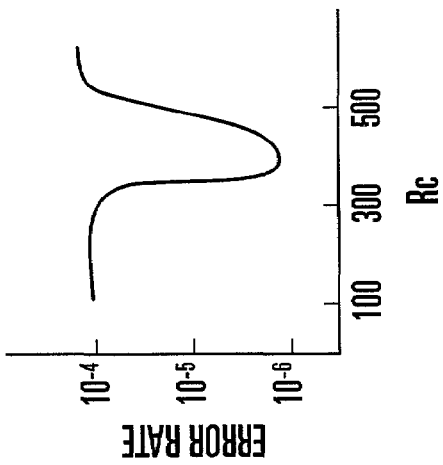
FIGS. 22(a) to 22(c) are graphs showing the relationship between each control variable of the equalizer shown in FIG. 18 and an error rate.
Figure 22B:
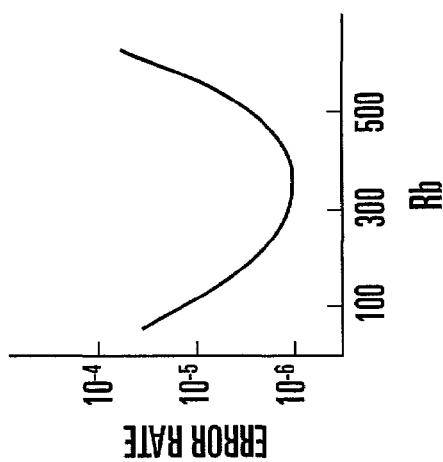
Figure 22C:
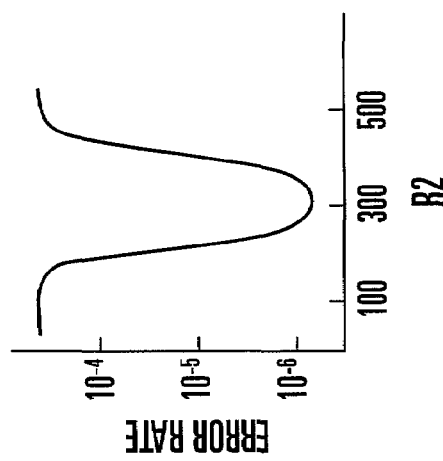

FIGS. 22(a) to 22(c) show the manners of error rates obtained when the values of variable resistors R2, Rb and Rc shown in FIGS. 19(a) and 19(b) are varied with a combination of a given tape and a given head. The optimum values of the variable resistors R2, Rb and Rc vary with the characteristic of the tape and the characteristic of the head. In order to minimize an error rate, it is necessary to control the equalizing characteristic in accordance with the characteristic of the tape and the characteristic of the head.

Figure 23A:
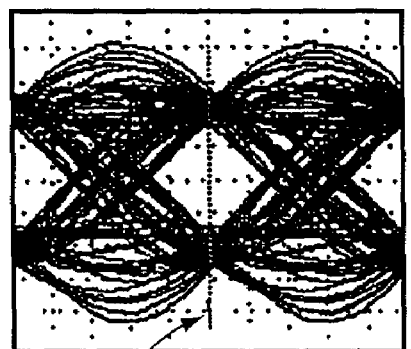
FIGS. 23(a) and 23(b) are diagrams showing eye patterns of reproduced signals obtained by the VTR shown in FIG. 17.
Figure 23B:
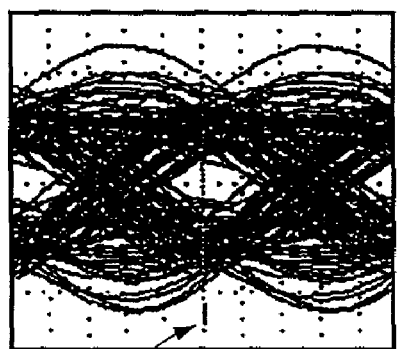

FIGS. 23(a) and 23(b) respectively show the manner of an eye pattern of a signal equalized with a correct equalizing characteristic and the manner of an eye pattern obtained in a case where there is a large equalization error.

In a case where the equalizing characteristic is optimum, data are detected as values close to "−1" and "1" at the data detecting point, as shown in FIG. 23(a). On the other hand, in a case where the equalizing characteristic is not optimum and there is a large equalization error, the eye pattern is disordered as shown in FIG. 23(b) and data are detected as values distant from "−1" and "1" at the data detecting point.

The reproduced signal equalized by the equalizer 127 is converted by the A/D converter 109 into a digital signal composed of a plurality of bits per sample, and is then outputted to a PLL (phase-locked loop) 113 and a PR4 (partial response class-4) decoder 115.

The PLL 113 generates a clock signal synchronized with the digital signal received from the A/D converter 109, and outputs the clock signal to the A/D converter 109. The A/D converter 109 samples the reproduced signal received from the equalizer 127 according to the clock signal supplied from the PLL 113, and quantizes the reproduced signal with a plurality of bits per sample.

The PR4 decoder 115, similarly to that in the first embodiment, subjects the reproduced signal from the A/D converter 109 to a decoding process for PR4, and then outputs the processed signal to an evaluation circuit 117 and a Viterbi decoder 121.

The evaluation circuit 117, similarly to that in the first embodiment, evaluates the characteristic of the equalizer 127 as will be described later, and outputs a result of the evaluation to an equalizer control circuit 129.

The equalizer control circuit 129 controls the gain of the amplifier 105 and the values of the control signals EQC, GDL and GDH to be supplied to the equalizer 127, on the basis of the evaluation values outputted from the evaluation circuit 117 and an error flag outputted from an error correction circuit 135.

The Viterbi decoder 121 detects a digital signal composed of one bit per sample from the output of the PR4 decoder 115 by using a known Viterbi algorithm, and outputs the detected digital signal to a memory 137. The error correction circuit 135 corrects any error included in the reproduced signal by applying an error correcting decoding process to the reproduced signal stored in the memory 137 while using parity data added at the time of recording, and, when there is an uncorrectable error, generates an error flag indicative of the presence of such an error and outputs the error flag to the equalizer control circuit 129.

The signal processing circuit 123 reads out from the memory 137 the reproduced signal in which the error correcting process has been completed, and applies, to a video signal and an audio signal included in the reproduced signal, a decoding process corresponding to the coding process applied at the time of recording, then outputting the processed signals. In the digital VTR according to the second embodiment, since a video signal and an audio signal which are coded are recorded and reproduced, the signal processing circuit 123 includes a decoding circuit for decoding the video signal and the audio signal.

A system controller 133 controls the equalizer control circuit 129 and the various parts of the VTR 100 according to instructions given by an operation switch 131.

Next, a control operation for the equalizing characteristic of the equalizer 127 in the second embodiment will be described.

Figure 24:
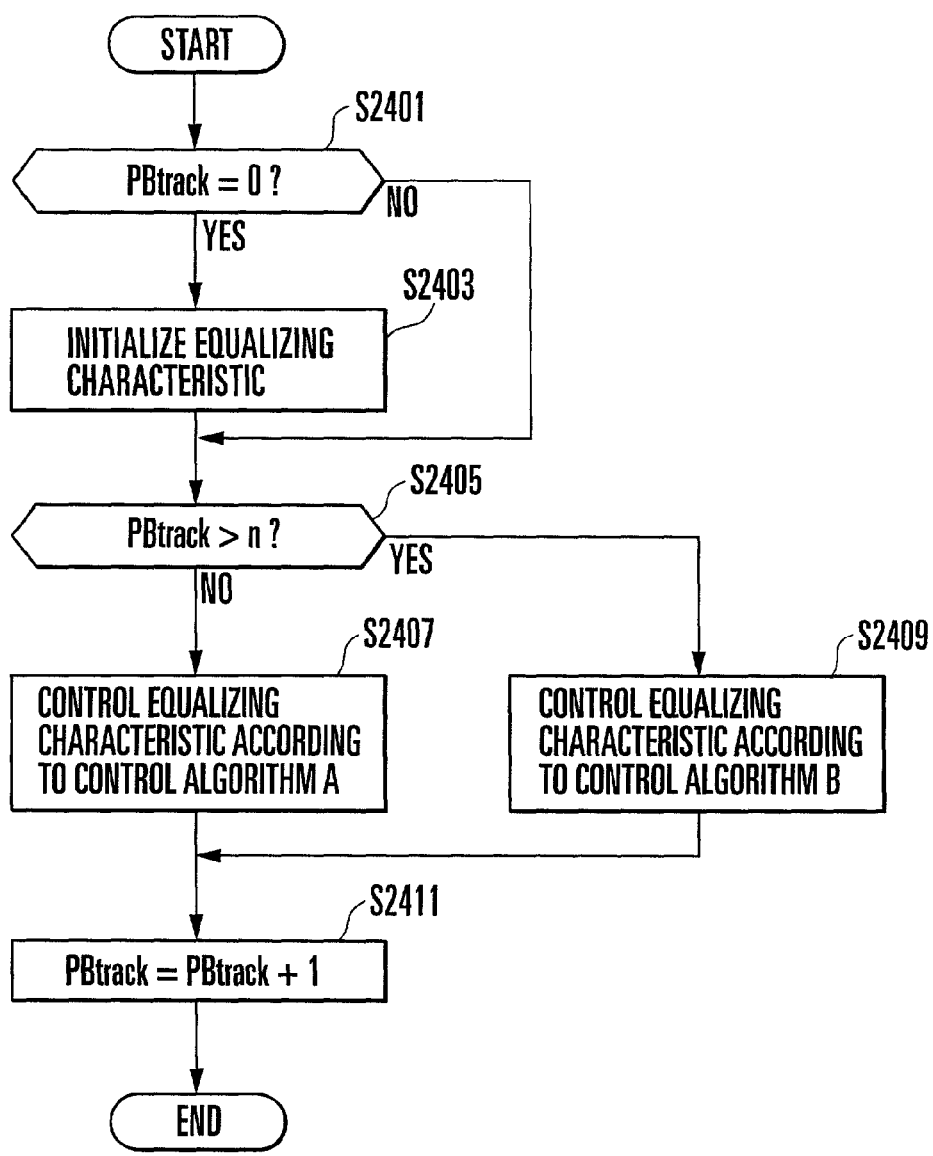
FIG. 24 is a flow chart for explaining a control operation for the equalizing characteristic of the VTR shown in FIG. 17.

FIG. 24 is a flow chart showing the control operation of the equalizer control circuit 129.

When an instruction for starting a reproducing operation is given by the system controller 133, the flow shown in FIG. 24 is executed for every track. With the reproducing operation started, a CPU (central processing unit) incorporated in the equalizer control circuit 129 resets, to "0", a variable PBtrack for counting the number of tracks subjected to the reproducing operation, and begins to execute the flow shown in FIG. 24 according to a head switching pulse signal (not shown).

With the flow starting, first, the CPU makes a check to find if the above variable PBtrack is "0" (S2401). If it is found that the variable PBtrack is "0", the CPU resets the control signals EQC, GDL and GDH to respective predetermined initial values (S2403).

Next, the CPU makes a check to find if the variable PBtrack indicative of the number of tracks subjected to the reproducing operation has exceeded a predetermined value "n" (S2405). If it is found that the variable PBtrack has not yet exceeded the predetermined value "n", the CPU selects a control algorithm A, which is a method for controlling the equalizing characteristic on the basis of the evaluation values from the evaluation circuit 117, and controls the equalizing characteristic according to the control algorithm A (S2407). On the other hand, if it is found that the variable PBtrack has exceeded the predetermined value "n", the CPU selects a control algorithm B, which is a method for controlling the equalizing characteristic by using the error flag, and controls the equalizing characteristic according to the control algorithm B (S2409).

Then, the CPU adds "1" to the variable PBtrack, and brings the flow to an end (S2411).

According to the flow chart of FIG. 24 described above, during a period until signals for n tracks are reproduced after the reproducing operation starts, the equalizing characteristic is controlled according to the control algorithm A, and, until the reproducing operation comes to an end after the reproducing period exceeds n tracks, the equalizing characteristic is controlled according to the control algorithm B. In the second embodiment, "n" is set to "20", so that, until signals for 20 tracks are reproduced after the start of a reproducing operation, the equalizing characteristic is controlled according to the control algorithm A.

According to the second embodiment, in the control algorithm A, the equalizing characteristic is controlled on the basis of the evaluation values from the evaluation circuit 117, and, in the control algorithm B, the equalizing characteristic is controlled on the basis of the error flag from the error correction circuit 135. Then, during a period for n tracks after the start of a reproducing operation, the equalizing characteristic is controlled while using the evaluation values only, without using the error flag, so that an optimum control operation for the equalizing characteristic can be performed more quickly.

Next, a control operation for the equalizing characteristic using the evaluation values in the control algorithm A will be described.

In a case where the equalizing characteristic is not appropriate, as shown in FIG. 23($b$), the eye pattern of a reproduced signal is disordered, so that the value of A/D-converted data does not become a value corresponding to "1" or "−1" at the data detecting point.

Therefore, in the second embodiment, the absolute value of a difference between A/D-converted data and digital data obtained by two-value-detecting the A/D-converted data is obtained by the evaluation circuit 117 and is then used as the evaluation value, and the equalizing characteristic of the equalizer 127 is controlled in such a way as to make the evaluation value close to "0".

In the second embodiment, the arrangement of the evaluation circuit 117 is the same as that shown in FIG. 10, and the evaluation values "a", "b", "c", "d" and "e" are also obtained from the evaluation circuit 117 as mentioned in the foregoing. Further, the manners of changes of the respective evaluation values obtained when the control signals EQC, GDL and GDH are varied are also the same as those shown in FIGS. 11($a$) to 11($c$).

Next, the operation of the equalizer control circuit 129 using the outputs of the evaluation circuit 117 will be described.

The equalizer control circuit 129 inputs the outputs of the evaluation circuit 117 to the microcomputer incorporated in the evaluation circuit 117, and judges the status of the equalizing operation of the equalizer 127 on the basis of the outputs of the detection circuits 1033A to 1033E. Then, according to a result of the judgment, the equalizer control circuit 129 changes the values of the control signals EQC, GDL and GDH to be supplied to the equalizer 127, and the gain of the amplifier 105. This arrangement makes it possible to realize an optimum equalizing characteristic. In the following, the control operation of the equalizer control circuit 129 using the evaluation values will be described with reference to the flow chart of FIG. 25.

Figure 25:
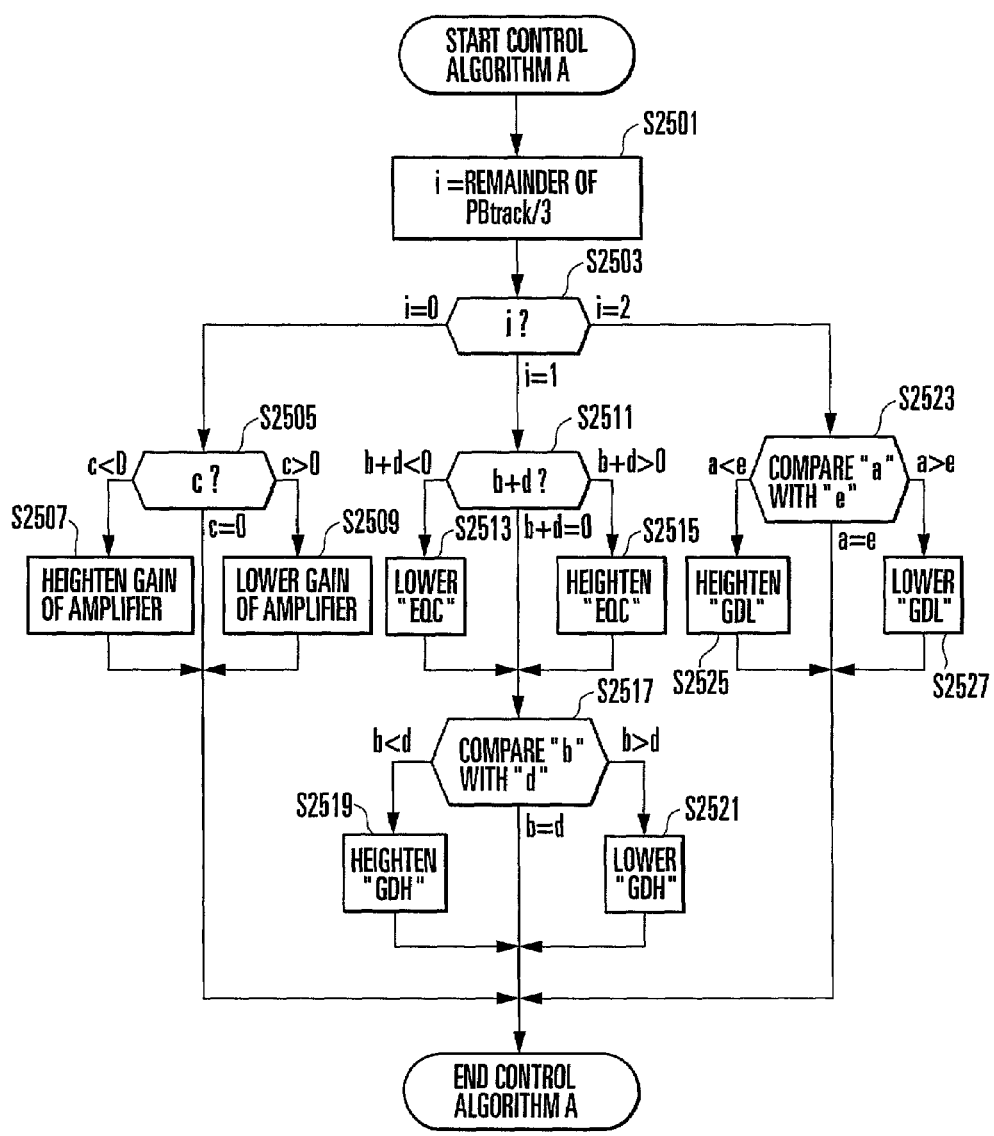
FIG. 25 is a flow chart for explaining a control operation of an equalizer control circuit included in the VTR shown in FIG. 17.

FIG. 25 is a flow chart for explaining the processing operation of the microcomputer incorporated in the equalizer control circuit 129 using the control algorithm A, i.e., the evaluation values.

The flow shown in FIG. 25 is repeatedly executed for every track by the microcomputer incorporated in the equalizer control circuit 129 during a period for 20 tracks from the start of a reproducing operation.

First, at step S2501, the value of the above-mentioned variable PBtrack is divided by "3", and a remainder of such division is obtained as a variable "i". The variable "i" takes any one of values of "0", "1" and "2". According to the value of the variable "i", the amplifier 105 and the equalizer 127 are controlled (S2503). Accordingly, a processing operation from step S2505 to step S2509, a processing operation from step S2511 to step S2521, and a processing operation from step S2523 to step S2527 each are performed once for three tracks.

In a case where the variable "i" is "0", the evaluation value "c" read out from the evaluation circuit 117 is evaluated (S2505). If the evaluation value "c" is smaller than "0", the microcomputer heightens the gain of the amplifier 105 by a predetermined amount in step S2507. If the evaluation value "c" is larger than "0", the microcomputer lowers the gain of the amplifier 105 by a predetermined amount in step S2509. Further, if the evaluation value "c" is "0", the microcomputer brings the flow to an end without changing the gain of the amplifier 105.

More specifically, in the second embodiment, since, if the detection value of the detection circuit 1033C indicative of the correlation between the equalization result by the equalizer 127 and the detection result is not in the vicinity of "0", errors occur in the detection results by the other detection circuits 1033A, 1033B, 1033D and 1033E, the gain of the amplifier 105 is adjusted so as to match the level of the output signal of the equalizer 127 corresponding to the above-mentioned data D0 with an appropriate level. Incidentally, while, in the second embodiment, the level of the output signal of the equalizer 127 is made to match with an appropriate level by adjusting the gain of the amplifier 105, the threshold value of the decoder 1003 of the evaluation circuit 117 may be controlled instead, having the same effect, as described in the first embodiment.

In a case where the variable "i" is "1", the microcomputer evaluates, in step S2511, a result of addition of the evaluation values "b" and "d" read out from the evaluation circuit 117. If the result of addition of "b+d" is smaller than "0", the microcomputer lowers, in step S2513, the value of the control signal EQC, i.e., a control signal to be supplied to the variable resistor R2, by a predetermined amount. If the result of addition of "b+d" is larger than "0", the microcomputer heightens, in step S2515, the value of the control signal EQC, by a predetermined amount. If the result of addition of "b+d" is "0", the procedure proceeds to step S2517.

Next, in the step S2517, the microcomputer compares the evaluation value "b" with the evaluation value "d". If the evaluation value "b" is smaller than the evaluation value "d", the procedure proceeds to step S2519. In the step S2519, the microcomputer heightens the value of the control signal GDH by a predetermined amount. If the evaluation value "b" is larger than the evaluation value "d", the procedure proceeds to step S2521. In the step S2521, the microcomputer lowers the value of the control signal GDH by a predetermined amount. Further, if the evaluation value "b" is equal to the evaluation value "d", the flow is brought to an end without changing the control signal GDH.

In a case where the variable "i" is "2", the microcomputer compares, in step S2523, the evaluation value "a" with the evaluation value "e". If the evaluation value "a" is smaller than the evaluation value "e", the procedure proceeds to step S2525. In the step S2525, the microcomputer heightens the value of the control signal GDL by a predetermined amount. If the evaluation value "a" is larger than the evaluation value "e", the procedure proceeds to step S2527. In the step S2527, the microcomputer lowers the value of the control signal GDL by a predetermined amount. Further, if the evaluation value "a" is equal to the evaluation value "e", the flow is brought to an end without changing the control signal GDL.

As described above, according to the control algorithm A, the correlation between a PR4 signal subjected to an equalizing process by the equalizer 127 and a detection result obtained by the decoder 1003 included in the evaluation circuit 117 is obtained, and a group delay characteristic of the equalizer 127 is controlled on the basis of the obtained correlation. Accordingly, it is possible to control the equalizer 127 in such a way as to compensate for equalization errors of the equalizer 127 itself without depending on an error rate.

In other words, since it is unnecessary to count the number of errors so as to control the equalizing characteristic, it is possible to control the equalizing characteristic extremely quickly, and it is possible to realize an excellent equalizing process from immediately after the start of a reproducing operation.

Further, even in a state in which an error rate is extremely low, it is possible to accurately control the equalizing characteristic. Further, it is possible to control the equalizing characteristic to an original optimum value without causing a change of the equalizing characteristic to follow a change of the error rate due to physical factors such as a dropout or the like.

Next, the control algorithm B will be described.

According to the second embodiment, in the control algorithm B, the error flag outputted from the error correction circuit 135 is counted for a predetermined number of track periods, and, according to the thus-obtained counted value, the equalizing characteristic is controlled to be made optimum, i.e., the so-called hill-climbing control method is applied to the equalizing control operation.

Further, a reproduced signal in the second embodiment is arranged such that a video signal, an audio signal and a sub-code for one track are divisionally recorded in 149 synchronizing blocks into which one track is divided, and the error correction circuit 135 generates the error flag for each synchronizing block. Accordingly, the number of error flags obtainable in one track is 149 at the most.

In addition, in order to avoid the influence of a burst error as much as possible and to control the equalizing characteristic stably, it is necessary to count the number of error flags for a certain extent of period. With such a period represented by "m", in the second embodiment, "m" is set to "50", so that the equalizing characteristic is controlled on the basis of the number of error flags obtained for 50 track periods.

Next, the equalization control operation according to the control algorithm B will be described with reference to the flow chart of FIG. 26.

Figure 26:
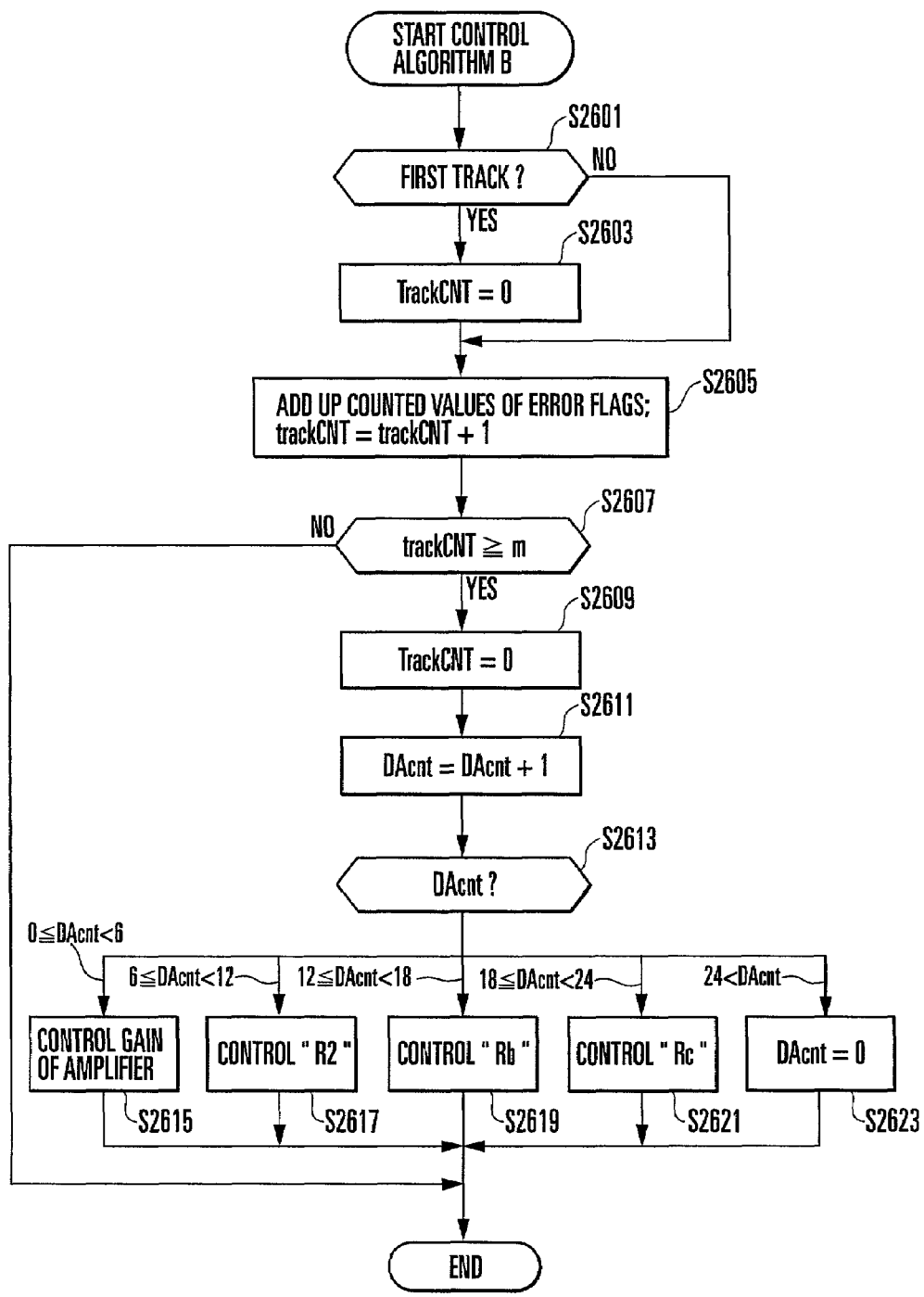
FIG. 26 is a flow chart for explaining another control operation of the equalizer control circuit included in the VTR shown in FIG. 17.

FIG. 26 is a flow chart showing the control operation for the equalizing characteristic using the error flag, which is performed by the equalizer control circuit 129 according to the control algorithm B. When the control operation for the equalizing characteristic according to the control algorithm B starts after 20 track periods have elapsed from the start of a reproducing operation, the flow shown in FIG. 26 is executed for every track.

When the control algorithm B has started, first, the microcomputer incorporated in the equalizer control circuit 129 makes a check to find if a track being currently subjected to the reproducing operation is the beginning track, i.e., the first track, for the control algorithm B (S2601). If the track being currently subjected to the reproducing operation is the first track, the microcomputer sets, to "0", the value of a variable trackCNT for counting the number of tracks for which error flags are counted up (S2603). If the track being currently subjected to the reproducing operation is not the first track, the procedure proceeds to step S2605 without passing through the step S2603.

In the step S2605, the microcomputer adds, to the present number of error flags, the number of error flags obtained in the preceding one track period, and adds "1" to the value of the variable trackCNT. Then, the microcomputer makes a check to find if the value of the variable trackCNT has reached "m", i.e., "50" in this case (S2607). If the variable trackCNT has not yet reached "50", the flow is brought to an end.

If the variable trackCNT has reached "50", the microcomputer sets the variable trackCNT to "0" (S2609), and adds "1" to a variable DAcnt for counting the number of times of control of the equalizing characteristic (S2611). Then, the microcomputer makes a check for the value of the variable DAcnt (S2613), and, according to the value of the variable DAcnt, controls the equalizing characteristic in an optimum manner by changing the gain of the amplifier 105 and the values of the resistors R2, Rb and Rc in sequence as will be described below.

First, when the value of the variable DAcnt is "0" or more but less than "6", i.e., as long as the number of times of change of the equalizing characteristic is "0" to "5", the gain of the amplifier 105 is changed, on the basis of the number of errors for 50 tracks as counted, in such a way as to lessen that number of errors (S2615). This control operation is performed six times at intervals of 50 tracks until the variable DAcnt becomes "5". Thus, the hill-climbing control operation is performed in such a way that the gain of the amplifier 105 becomes such a value as to make the number of errors least.

Next, when the value of the variable DAcnt is "6" or more but less than "12", the value of the resistor R2 is changed, on the basis of the number of errors for 50 tracks as counted, in such a way as to lessen that number of errors (S2617). This control operation is performed six times at intervals of 50 tracks until the variable DAcnt becomes "11". Thus, the hill-climbing control operation is performed in such a way that the amplitude characteristic of the high-frequency emphasizing circuit 1801b becomes such a characteristic as to make the number of errors least.

Next, when the value of the variable DAcnt is "12" or more but less than "18", the value of the resistor Rb is changed, on the basis of the number of errors for 50 tracks as counted, in such a way as to lessen that number of errors (S2619). This control operation is performed six times at intervals of 50 tracks until the variable DAcnt becomes "17". Thus, the hill-climbing control operation is performed in such a way that the group delay characteristic of the APF 1803*a* becomes such a characteristic as to make the number of errors least.

Next, when the value of the variable DAcnt is "18" or more but less than "24", the value of the resistor Rc is changed, on the basis of the number of errors for 50 tracks as counted, in such a way as to lessen that number of errors (S2621). This control operation is performed six times at intervals of 50 tracks until the variable DAcnt becomes "23". Thus, the hill-climbing control operation is performed in such a way that the group delay characteristic of the APF 1803*b* becomes such a characteristic as to make the number of errors least.

Then, when the variable DAcnt has reached "24", the microcomputer sets the variable DAcnt to "0" again (S2623), thereafter returning to the control of the gain of the amplifier 105.

In the hill-climbing control operation for each of the resistors R2, Rb and Rc in the second embodiment, the value of each of the resistors R2, Rb and Rc is changed by ±10 control amounts (units of control of each variable resistor to be used in the microcomputer incorporated in the equalizer control circuit 129) alternately for every control operation. The numbers of errors for 50 tracks at that time are compared with each other. Then, the value of each of the resistors R2, Rb and Rc obtained when the number of errors is least is selected and is set as a control value for the equalizing characteristic of the equalizer 127.

As described above, according to the control algorithm B, since the equalizing characteristic of the equalizer 127 is controlled on the basis of the number of errors obtained for a predetermined period (50 track periods in the case of the second embodiment), although a response is slower than in the case of the above-mentioned control operation using the evaluation values, it is possible to perform a stable control operation for the equalizing characteristic without being influenced by a random error.

As has been described above, according to the second embodiment, during a period for which data for n tracks are reproduced after the start of the reproducing operation, the equalizing characteristic of the equalizer 127 is controlled by using an evaluation value indicative of the difference between a reproduced signal and a two-value-detection result without using any error flag, so that an optimum control operation for the equalizing characteristic can be performed from immediately after the start of the reproducing operation. Further, after n track periods have elapsed, a control operation for the equalizing characteristic using an error flag is performed, so that a stable control operation for the equalizing characteristic can be performed.

Incidentally, while, in the second embodiment, the evaluation value is obtained by the evaluation circuit 117, instead, the same processing operation as that of the evaluation circuit 117 may be executed by a software processing using a register, a microprocessor or the like.

Further, while, in the second embodiment, "n" is set to "20" and a period for counting error flags is set to 50 track periods, these factors are not limited to "20" and "50", and may be other values.

Further, while, in the second embodiment, the flow shown in FIG. 25 is repeatedly performed for every track, it may be repeated a plurality of times within one track period.

Further, while, in each of the above-described first and second embodiments, the invention is applied to a digital VTR, the invention is also applicable to other arrangements for reproducing data and applying an equalizing process to the reproduced data.

The invention claimed is:

1. A reproducing apparatus, comprising:
   reproducing means for reproducing an information signal from a recording medium;
   equalizing means for controlling a group delay of the information signal reproduced by said reproducing means;
   converting means for sampling the information signal output from said equalizing means and for converting the information signal into a digital signal composed of a plurality of bits per sample;
   detecting means for converting the digital signal output from said converting means into a n-values signal per sample; and
   control means for controlling said equalizing means by using both the digital signal to be input to said detecting means and the n-values signal output from said detecting means,
   wherein said control means includes multiplying means for multiplying the digital signal to be input to said detecting means by the n-values signal output from said detecting means to output an evaluation value signal representing a level of predetermined frequency of the information signal output from said equalizing means, and
   wherein said control means controls a group delay characteristic of said equalizing means according to the evaluation value signal.

2. A reproducing apparatus according to claim 1, wherein said equalizing means further controls an amplitude of the information signal reproduced by said reproducing means, and said control means further controls an amplitude characteristic of said equalizing means by using the digital signal to be inputted to said detecting means and the detection result of said detecting means.

3. A reproducing apparatus according to claim 1, wherein said control means includes integrating means for integrating a result of multiplication of said multiplying means, to output a result of said integration as the evaluation value.

4. A reproducing apparatus according to claim 3, wherein said multiplying means includes 2n+1 multipliers (n being an integer not less than "2") for respectively multiplying the n-values signal of a predetermined sample by the digital signal corresponding to the predetermined sample and the digital signal of n samples obtained both before and after the digital signal corresponding to the predetermined sample, and said integrating means includes 2n+1 integrators for respectively integrating outputs of said 2n+1 multipliers.

5. A reproducing apparatus according to claim 4, wherein said equalizing means includes a first group delay control circuit for controlling a group delay of a first predetermined frequency band, and a second group delay control circuit for controlling a group delay of a second predetermined frequency band which is lower than the first predetermined frequency band, and said control means controls a group delay characteristic of said first group delay control circuit according to results of integration of said integrating means of samples obtained n/2 samples before and after the predetermined sample, and controls a group delay characteristic of said second group delay control circuit according to results of integration of said integrating means of samples obtained n samples before and after the predetermined sample.

6. A reproducing apparatus according to claim 5, wherein said control means makes a comparison between results of integration of said integrating means of samples obtained n/2 samples before and after the predetermined sample, and controls the group delay characteristic of said first group delay control circuit according to a result of the comparison.

7. A reproducing apparatus according to claim 5, wherein said control means makes a comparison between results of integration of said integrating means of samples obtained n samples before and after the predetermined sample, and controls the group delay characteristic of said second group delay control circuit according to a result of the comparison.

8. A reproducing apparatus according to claim 1, wherein said equalizing means includes a first group delay equalizing circuit for controlling a group delay of a first predetermined frequency band, and a second group delay equalizing circuit for controlling a group delay of a second predetermined frequency band which is lower than the first predetermined frequency band, and said control means controls a group delay characteristic of said first group delay equalizing circuit and a group delay characteristic of said second group delay equalizing circuit independently of each other.

9. A reproducing apparatus according to claim 8, wherein each of said first group delay equalizing circuit and said second group delay equalizing circuit includes an all-pass filter.

10. A reproducing apparatus according to claim 1, further comprising:
an FIR (finite impulse response) filter for filtering an output of said equalizing means, wherein said control means further controls tap coefficients of said FIR filter.

11. A reproducing apparatus according to claim 1, further comprising:
data detecting means for detecting a digital signal composed of one bit per sample from the reproduced information signal equalized by said equalizing means; and
signal processing means for subjecting a predetermined process to an output of said data detecting means.

12. A reproducing apparatus according to claim 11, wherein the information signal includes an image signal as coded, and said signal processing means includes decoding means for decoding the image signal.

13. A reproducing apparatus according to claim 11, wherein said data detecting means detects the digital signal composed of one bit per sample by using a Viterbi algorithm.

14. A reproducing apparatus according to claim 1, wherein the information signal is a PR4-precoded signal, and said detecting means includes a decoder for PR4-decoding the digital signal output from said converting means, and converts the digital signal output from said decoder into the n-values signal.

15. A reproducing apparatus, comprising:
reproducing means for reproducing an information signal from a recording medium;
equalizing means for controlling a group delay of the information signal reproduced by said reproducing means;
converting means for sampling the information signal output from said equalizing means and for converting the information signal into a digital signal composed of a plurality of bits per sample;
detecting means for converting the digital signal output from said converting means into a n-values signal per sample;
error correcting means for correcting errors in the digital signal output from said converting means and for detecting uncorrectable errors in the digital signal; and
control means for controlling an equalizing characteristic of said equalizing means,
said control means including multiplying means for multiplying the digital signal to be input to said detecting means by the n-values signal output from said detecting means to output an evaluation value signal representing a level of predetermined frequency of the information signal output from said equalizing means, and
said control means having a first mode of controlling a group delay characteristic of said equalizing means according to the evaluation value signal and a second mode of controlling the equalizing characteristic by using a detection result of the uncorrectable errors by said error correcting means.

16. A reproducing apparatus according to claim 15, wherein said control means changes over the first mode and the second mode according to elapsed time.

17. A reproducing apparatus according to claim 15, wherein said reproducing means reproduces the information signal from a recording medium having a number of helical tracks formed thereon, and said control means changes over the first mode and the second mode according to the number of reproduced tracks of the recording medium.

18. A reproducing apparatus according to claim 15, further comprising:
instruction means for giving an instruction for starting a reproducing operation,
wherein said control means controls the equalizing characteristic in the second mode during a predetermined period of time from the instruction for starting the reproducing operation, and controls the equalizing characteristic in the first mode after a lapse of the predetermined period of time.

19. A reproducing apparatus according to claim 1, wherein said multiplying means outputs the evaluation value signal representing a level of predetermined frequency in an impulse waveform of the information signal output from said equalizing means, and said control means controls the group delay characteristic of said equalizing means so that the impulse waveform of the information signal becomes symmetrical.

* * * * *